United States Patent
Katsu et al.

(10) Patent No.: US 9,864,040 B2
(45) Date of Patent: Jan. 9, 2018

(54) POSITION CORRECTION APPARATUS, POSITION CORRECTION METHOD, PROGRAM, POSITION CORRECTION SYSTEM

(71) Applicant: Sony Corporation, Tokyo (JP)

(72) Inventors: Masanori Katsu, Tokyo (JP); Masatomo Kurata, Tokyo (JP); Takashi Ogata, Tokyo (JP); Yasutaka Fukumoto, Tokyo (JP); Tomoharu Ohsumi, Tokyo (JP)

(73) Assignee: Sony Corporation (JP)

( * ) Notice: Subject to any disclaimer, the term of this patent is extended or adjusted under 35 U.S.C. 154(b) by 342 days.

(21) Appl. No.: 14/670,693

(22) Filed: Mar. 27, 2015

(65) Prior Publication Data

US 2015/0198693 A1 Jul. 16, 2015

Related U.S. Application Data

(63) Continuation of application No. 13/425,929, filed on Mar. 21, 2012, now Pat. No. 9,013,353.

(30) Foreign Application Priority Data

Mar. 28, 2011 (JP) .................................. 2011-069841

(51) Int. Cl.
*G01S 5/02* (2010.01)
*G01S 19/40* (2010.01)
*G01C 21/34* (2006.01)

(52) U.S. Cl.
CPC .............. *G01S 5/021* (2013.01); *G01C 21/34* (2013.01); *G01S 19/40* (2013.01)

(58) Field of Classification Search
CPC .......... G01S 5/021; G01S 19/40; G01C 21/34
(Continued)

(56) References Cited

U.S. PATENT DOCUMENTS 5,867,122 A * 2/1999 Zahm ...................... G01S 19/14
342/357.33
6,636,249 B1 10/2003 Rekimoto
(Continued)

FOREIGN PATENT DOCUMENTS

DE 19746427 A1 * 6/1998 ............. G01S 19/14
EP 0936520 A2 8/1999
(Continued)

OTHER PUBLICATIONS

European Examination Report for Application No. 12160373.2 dated Apr. 28, 2016.
European Search Report EP 12160373, dated Oct. 9, 2012.

*Primary Examiner* — Harry Liu
(74) *Attorney, Agent, or Firm* — Lerner, David, Littenberg, Krumholz & Mentlik, LLP

(57) ABSTRACT

Systems and methods for correcting a location of a terminal are provided. In various aspects, a processor in a position correction apparatus may associate a reference position with the terminal, and determine a range for the terminal based on the reference position. The processor may also associate a second position with the terminal, and determine if the second position associated with the terminal is outside the determined range for the terminal based on the reference position. Upon a determination that indicates that the second position is outside the determined range, the processor may correct the second position to a corrected position associated with the terminal.

18 Claims, 15 Drawing Sheets

(58) Field of Classification Search
USPC .......................................................... 701/465
See application file for complete search history.

(56) References Cited

U.S. PATENT DOCUMENTS

| | | |
|---|---|---|
| 7,685,524 B2 | 3/2010 | Rekimoto |
| 7,716,606 B2 | 5/2010 | Rekimoto |
| 7,855,683 B2 | 12/2010 | Razoumov et al. |
| 2005/0101333 A1 | 5/2005 | Raith |
| 2005/0261833 A1* | 11/2005 | Brosius ................. G01S 5/0036 701/469 |
| 2006/0212183 A1* | 9/2006 | Wills ................. B61L 27/0016 701/19 |
| 2009/0219199 A1 | 9/2009 | Borchert et al. |
| 2010/0063656 A1* | 3/2010 | Knott ...................... B61L 3/221 701/19 |
| 2010/0093368 A1 | 4/2010 | Meyer et al. |
| 2010/0198867 A1 | 8/2010 | Rekimoto |
| 2011/0208496 A1* | 8/2011 | Bando .................... G01S 19/49 703/2 |

FOREIGN PATENT DOCUMENTS

| | | |
|---|---|---|
| JP | 10141966 A | 5/1998 |
| JP | 2000329578 A | 11/2000 |
| JP | 2001108457 A | 4/2001 |
| JP | 2006-171012 A | 6/2006 |
| JP | 2006-345269 | 12/2006 |
| JP | 2009058250 A | 3/2009 |
| JP | 2009115588 A | 5/2009 |
| JP | 2009229204 A | 10/2009 |

\* cited by examiner

FIG.3

| ESTIMATION TIME | LONGITUDE (X-AXIS) | LONGITUDE (X-AXIS) | ACTION LABEL | POSITIONING METHOD | OTHER INFORMATION |
|---|---|---|---|---|---|
| 2010/11/1 12:31:00 | 139.123456 | 35.123456 | MOVEMENT BY FOOT | WIRELESS LAN | 1ST FLOOR, BUILDING S |
| 2010/11/1 12:32:10 | 139.234567 | 35.234567 | MOVEMENT BY FOOT | WIRELESS LAN | 1ST FLOOR, BUILDING S |
| 2010/11/1 12:32:20 | 139.345678 | 35.345678 | MOVEMENT BY FOOT | WIRELESS LAN | 1ST FLOOR, BUILDING S |
| 2010/11/1 12:40:30 | 139.456789 | 35.456789 | REST | GPS | T PARK |

FIG.9
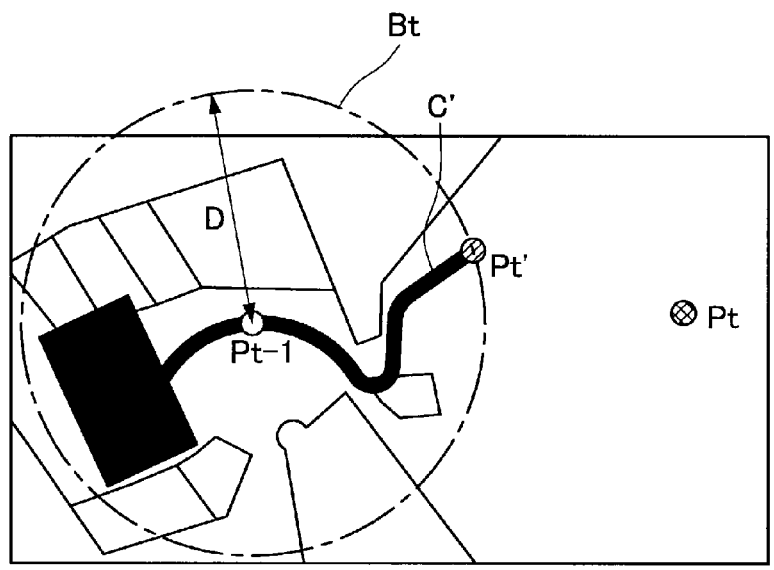
FIG.10
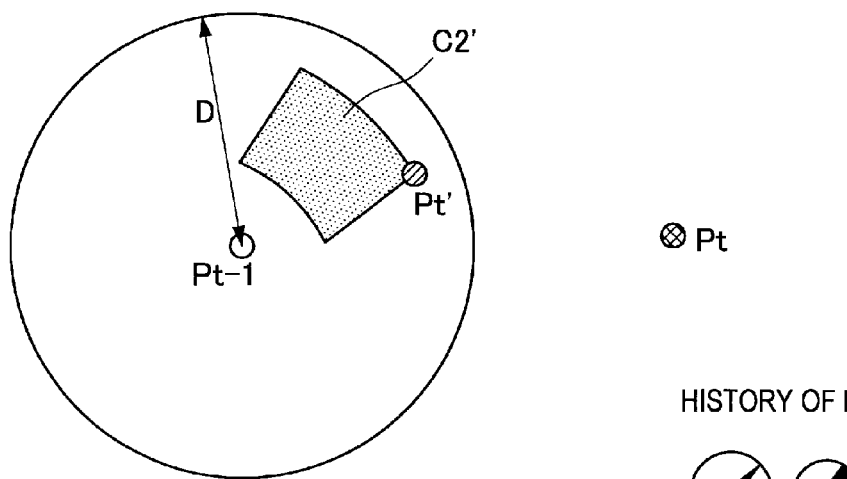
HISTORY OF DIRECTION

FIG.11

| ACTION LABEL | SELECTION CONDITION | POSITION CORRECTION ALGORITHM |
|---|---|---|
| LABEL R1 (MOVEMENT BY FOOT) | NONE | ALGORITHM 1 |
| | WEATHER = SUNNY OR CLOUDY | ALGORITHM 2 |
| | WEATHER = RAINY OR SNOWY | ALGORITHM 3 |
| LABEL R2 (MOVEMENT BY CAR) | TRANSPORTATION MEANS = CAR | ALGORITHM 4 |
| | TRANSPORTATION MEANS = BUS | ALGORITHM 5 |
| LABEL R3 (MOVEMENT BY TRAIN) | NONE | ALGORITHM 6 |
| LABEL R4 (MOVEMENT BY BICYCLE) | ENVIRONMENT INFORMATION = PAVED ROAD | ALGORITHM 7 |
| | ENVIRONMENT INFORMATION = UNPAVED ROAD | ALGORITHM 8 |
| LABEL R5 (REST) | NONE | ALGORITHM 9 |
| LABEL R6 (SHOPPING) | NONE | ALGORITHM 10 |

POSITION CORRECTION APPARATUS, POSITION CORRECTION METHOD, PROGRAM, POSITION CORRECTION SYSTEM

CROSS-REFERENCE TO RELATED APPLICATIONS

The present application is a continuation of U.S. patent application Ser. No. 13/425,929, filed on Mar. 21, 2012, which claims priority from Japanese Patent Application No. JP 2011-069841 filed in the Japan Patent Office on Mar. 28, 2011, the entire contents of which are incorporated herein by reference.

BACKGROUND

The present disclosure relates to a position correction apparatus, a position correction method, a program, and a position correction system.

Nowadays, a receiving apparatus capable of receiving a radio signal transmitted from a satellite is mounted in movable bodies such as automobiles and mobile phones. According to GPS (Global Positioning System) positioning, the position of a moving body in which such a receiving apparatus is mounted can be estimated. Position estimation technology using such a receiving apparatus is an important common fundamental technology in a wide variety of fields such as navigation, security, and entertainment.

JP 2006-171012A discloses a technology in which PHS (Personal Handy System) measures signal intensity of a signal transmitted from a base station and estimates the position of the local machine based on the measured signal intensity. More specifically, a base station of PHS is installed by a communication operator and thus, the installation location thereof is normally known. Therefore, if PHS measures signal intensity of signals transmitted from three base stations or more, and estimates the distance between each base station and the local machine based on the measured signal intensity, the position of the local machine can be estimated based on the principle of triangulation in which the installation position of each base station is used as a reference.

Also, there can be considered a position estimation technology in which a mobile terminal that performs radio communication with a base station (access point) of wireless LAN (Local Area Network) measures signal intensity of a signal transmitted from the base station and a position estimation apparatus communicable with the mobile terminal estimates the position of the mobile terminal based on the signal intensity. For example, a base station of wireless LAN transmits a beacon to signal the presence of the base station of the wireless LAN around the base station at fixed periods (for example, 5 times/sec). The mobile terminal transmits signal intensity of such a beacon to the position estimation apparatus and the position estimation apparatus cart estimate the position of the mobile terminal based on the signal intensity and the position of the wireless LAN registered in advance.

SUMMARY

However, according to various types of position estimation technology described above, it is possible to obtain an estimation result with high reliability when positioning accuracy is ensured, but the positioning accuracy is not necessarily ensured all the time, so there is a possibility that it is difficult to obtain an estimation result with high reliability. Therefore, it is desired that the position estimation with even higher reliability is performed.

In light of the foregoing, it is desirable to provide a novel and improved technology capable of improving the reliability of the position estimation.

In one aspect, a position correction apparatus for correcting a location of a terminal is provided. The position correction apparatus may include a processor, which may be configured so as to: associate a reference position with the terminal; determine a range for the terminal based on the reference position; associate a second position with the terminal; determine if the second position associated with the terminal is outside the determined range for the terminal based on the reference position; and, correct the second position to a corrected position associated with the terminal when a determination indicates that the second position is outside the determined range.

In another aspect, the processor in the position correction apparatus may be further configured to obtain the corrected position by determining a position within the determined range for the terminal that is nearest to the second position associated with the terminal.

In another aspect, the processor in the position correction apparatus may be further configured to associate an action label with the terminal based on an action of the terminal, and determine the range for the terminal based on the reference position and the action label associated with the terminal.

In another aspect, the processor in the position correction apparatus may be further configured to determine a circular boundary having a designated radius, where the reference position of the terminal may be included within the circular boundary, and, determine the range for the terminal based on the circular boundary.

In another aspect, the processor in the position correction apparatus may be further configured to determine route information for the terminal based on the reference position; and, determine the range for the terminal based on the route information.

In another aspect, the processor in the position correction apparatus may be further configured determine the route information by associating the reference position of the terminal with a position of a road.

In another aspect, the processor in the position correction apparatus may be further configured to determine the route information by associating the reference position of the terminal with a position of a railway track.

In another aspect, the processor in the position correction apparatus may be further configured to associate a destination with the terminal based on the route information, estimate a time or arrival of the terminal at the destination associated with the terminal, and, determine the range for the terminal based on the estimated time of arrival of the terminal at the destination.

In another aspect, the processor in the position correction apparatus may be further configured to determine a change in the reference position associated with the terminal based on a movement of the terminal, and, recalculate the range for the terminal based on the change in the reference position of the terminal.

In another aspect, the processor in the position correction apparatus may be further configured to determine a position accuracy for the reference position, determine if the position accuracy for the reference position is equal to or greater than a predetermined value, and, associate the reference position with the terminal when a determination indicates that the position accuracy for the reference position is equal to or greater than the predetermined value.

In another aspect, the processor in the position correction apparatus may be further configured to determine a positioning accuracy for the second position, determine if the positioning accuracy for the second position is less than a predetermined value, and, correct the second position to the corrected position associated with the terminal when it is determined that the second position is outside the determined range and the positioning accuracy for the second position is less than the predetermined value.

In various aspects, the terminal may be implemented within a personal computer, a video processing apparatus, a mobile phone, a music reproduction device, a personal digital assistant device, a game device, a global positioning device, and a consumer electronics device.

In another aspect, at least one of the reference position, the second position and the corrected position associated with the terminal device may include an altitude associated with the terminal device.

In another aspect, the processor in the position correction apparatus may be further configured to associate a time with at least one of the reference position, the second position and/or the corrected position associated with the terminal device.

A computer-implemented method for correcting a location of a terminal is provided. The computer-implemented method may include: associating a reference position with the terminal; determining, using a processor, a range for the terminal based on the reference position; associating a second position with the terminal; determining if the second position associated with the terminal is outside the determined range for the terminal based on the reference position; and, correcting the second position to a corrected position associated with the terminal when a determination indicates that the second position is outside the determined range.

A non-transitory computer-readable storage unit on which computer readable instructions of a program are stored is provided. The instructions, when executed by a processor, may cause the processor to: associate a reference position with the terminal; determine a range for the terminal based on the reference position; associate a second position with the terminal; determine if the second position associated with the terminal outside the range for the terminal based on the reference position; and, correct the second position to a corrected position associated with the terminal when a determination indicates that the second position is outside the determined range.

According to the embodiments of the present disclosure described above, it is possible to improve the reliability of the position estimation.

BRIEF DESCRIPTION OF THE DRAWINGS

FIG. 3 is a diagram showing a configuration example of data used by a correction section of the position correction apparatus.

FIG. 9 is a diagram illustrating an example of the position correction (case of using road information) performed by the position correction apparatus.

FIG. 10 is a diagram illustrating an example of the position correction (case of using information indicating a motion of a user) performed by the position correction apparatus.

FIG. 11 is a diagram showing an example of data used for algorithm selection performed by the position correction apparatus.

DETAILED DESCRIPTION OF THE EMBODIMENT(S)

Figure 1:
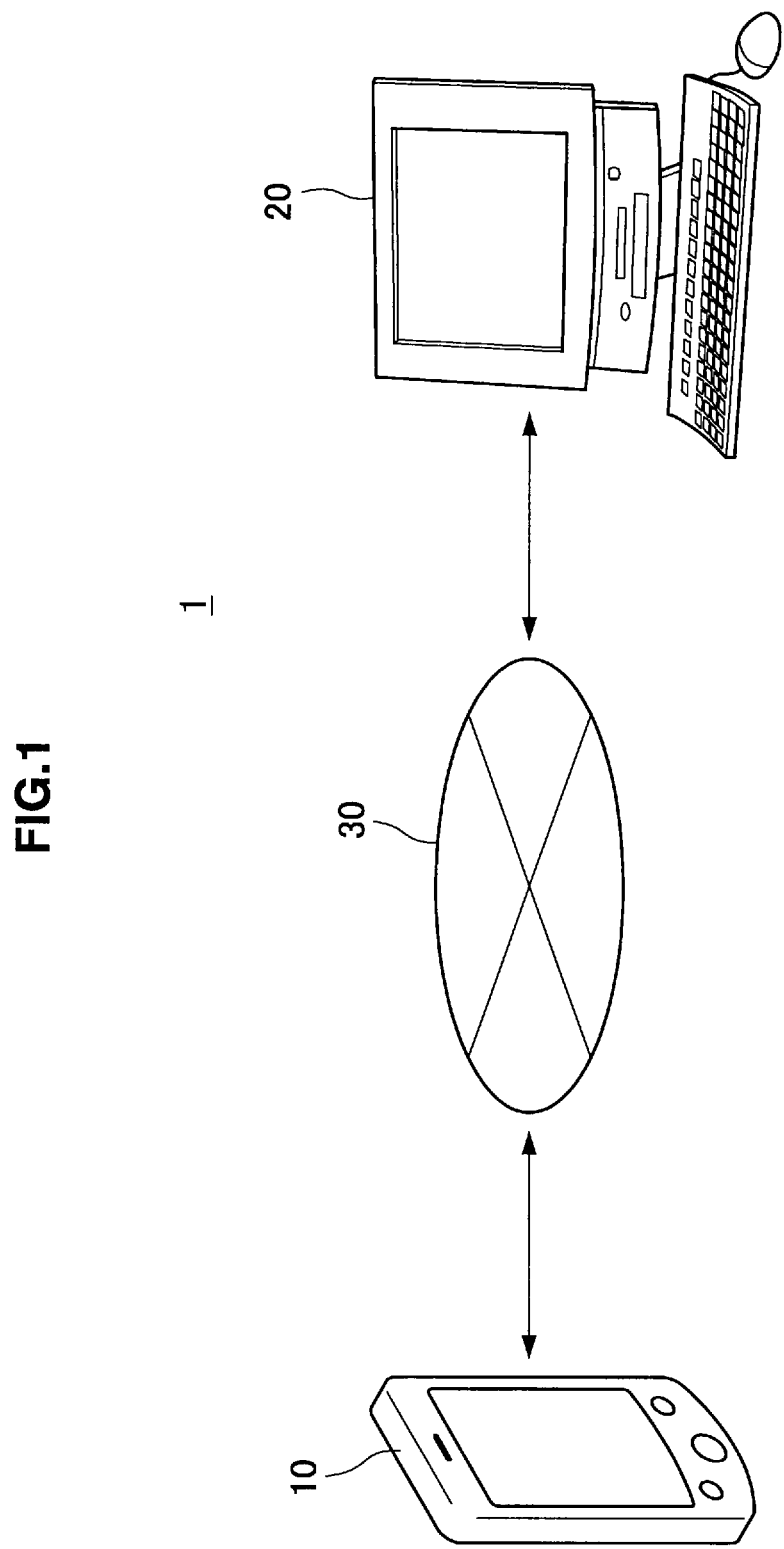
FIG. 1 is a diagram showing a configuration of a position correction system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference, numerals, and repeated explanation of these structural elements is omitted.

Further, in this specification and the appended drawings, there are some cases where multiple structural elements that have substantially the same function and structure are distinguished from one another by being denoted with different alphabets after the same reference numerals. Note that, in the case where it is not necessary to distinguish the multiple structural elements that have substantially the same function and structure from one another, the multiple structural elements are denoted with the same reference numeral only.

Further, the "detailed description of the embodiment(s)" will be described in the following order.

1. Description of embodiment
(Configuration of position correction system)
(Configurations of mobile terminal and position correction apparatus)
(Effects obtained when position correction apparatus is applied to various types of positioning technology)
(Hardware configuration of position correction apparatus)
2. Conclusion <1. Description of Embodiment>

Hereinafter, with reference to FIGS. 1 to 16, an embodiment of the present disclosure will be described in detail.

(Configuration of Position Correction System)

First, a position correction system according to the embodiment of the present disclosure will be described. In the position correction system according to the present embodiment, a position correction apparatus for configuring the position correction system has remarkable characteristics. Hereinafter, the description will be made using FIGS. 1 to 16.

FIG. 1 is a diagram showing a configuration of a position correction system 1 according to the present embodiment. As shown in FIG. 1, the position correction system 1 includes mobile terminal 10 and a position correction apparatus 20. The mobile terminal 10 and the position correction apparatus 20 are capable of communicating with each other via a network 30.

The network 30 is a wired or wireless transmission path for information transmitted from an apparatus connected to the network 30. For example, the network 30 may include a public line network such as the Internet, a telephone line network, and a satellite communication network, and a leased line network such as various types of LAN (Local Area Network) including Ethernet (registered trademark), WAN (Wide Area Network), and IP-VPN (Internet Protocol-Virtual Private Network).

The mobile terminal 10 is capable of acquiring position information indicating the position of the mobile terminal 10. A technique of acquiring the position information performed by the mobile, terminal 10 is not particularly limited. For example, the mobile terminal 10 stores in advance base station information in which position information indicating, the position at which a base station is set is associated with a base station ID, and, based on an intensity of a signal received from the base station and the base station information, the mobile terminal 10 estimates the position of the mobile terminal 10 using, for example, the principle of triangulation, thereby being able to acquire the position information. Further, for example, the mobile terminal 10 may also acquire the position information by estimating the position of the mobile terminal 10 using a signal received from a GPS satellite.

The position of the mobile terminal 10 is not necessarily estimated in the mobile terminal 10. For example, the reception result of a signal from the base station or the reception result of a signal from the GPS satellite may be transmitted to a position estimation server, and the position of the mobile terminal 10 may be estimated in the position estimation server. In that case, the mobile terminal 10 acquires the position information indicating the position of the mobile terminal 10, which is estimated in the position estimation server, and can transmit the position information to the position correction apparatus 20 via the network 30. Alternatively, the position correction apparatus 20 can also directly acquire, from the position estimation server, the position information indicating the position of the mobile terminal 10, which is estimated in the position estimation server.

The mobile terminal 10 may be an information processing apparatus such as a PC (Personal Computer), a video processing apparatus for home use (such as a DVD recorder and a video cassette recorder), a mobile phone, a PHS (Personal Handyphone System), a portable music reproduction device, a portable video processing device, a FDA (Personal Digital Assistant), a game device for home use, a portable game device, and a consumer electronics device.

The position correction apparatus 20 is capable of correcting the position information of the mobile terminal 10. It is not only the position of the mobile terminal 10 that the position correction apparatus 20 can correct, and the position correction apparatus 20 is also capable of correcting pieces of position information of other mobile terminals. Note that, although in the example shown in FIG. 1, the mobile terminal and the position correction apparatus 20 are each configured from separate hardware, the mobile terminal 10 and the position correction apparatus 20 may be configured from the same hardware. That is, the position correction apparatus 20 may be embedded in the mobile terminal 10, and the mobile terminal 10 and the position correction apparatus 20 may be provided in an integrated manner. Hereinafter, the configuration of each of the mobile terminal 10 and the position correction apparatus 20 according to the present embodiment will be described.

(Configurations of Mobile Terminal and Position Correction Apparatus)

Figure 2:
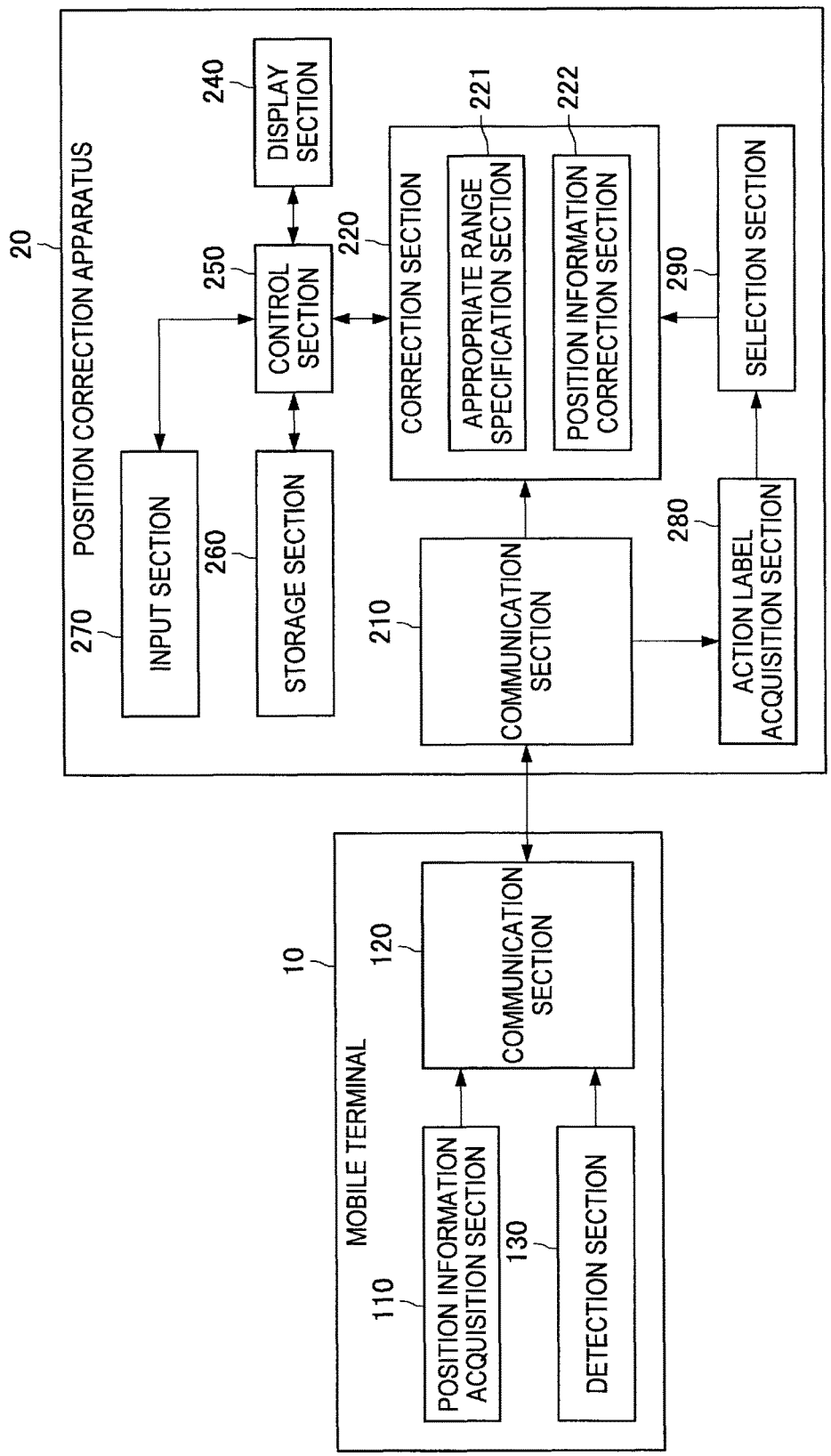
FIG. 2 is a functional block diagram showing a configuration of each of a mobile terminal and a position correction apparatus according to the embodiment of the present disclosure.

FIG. 2 is a functional block diagram showing the configuration of each of the mobile terminal 10 and the position correction apparatus 20 according to the present embodiment. As shown in FIG. 2, the mobile terminal 10 according to the present embodiment includes a position information acquisition section 110, a communication section 120, and a detection section 130.

The position information acquisition section 110 has a function of acquiring position information indicating the position of the mobile terminal 10. As described above, the technique of acquiring the position information performed by the position information acquisition section 110 is not particularly limited. Note that, as described above, in the case where the position correction apparatus 20 directly acquires the position information from the position estimation server or the like, the mobile terminal 10 may not include the position information acquisition section 110.

The detection section 130 has a function of detecting information indicating the motion of the user holding the mobile terminal 10. The detection section 130 may be configured from any hardware as long as the information indicating motion of the user can be detected, and may be configured from various types of sensors such as an acceleration sensor, a gyro sensor, a compass, a geomagnetic sensor, and a pressure sensor.

The communication section 120 has a function of communicating with the position correction apparatus 20 via the network 30. The communication section 120 can function as a transmission section which transmits, to the position correction apparatus 20, the position information acquired by the position information acquisition section 110 and the information indicating the motion of the user detected by the detection section 130, for example.

Further, shown in FIG. 2, the position correction apparatus 20 according to the present embodiment includes a communication section 210, a correction section 220, a display section 240, a control section 250, a storage section 260, an input section 270, an action label acquisition section 280, and a selection section 290. The correction section 220 includes an appropriate range specification section 221 and a position information correction section 222.

The communication section 210 has a function of communicating with the mobile terminal 10 via the network 30. The communication section 210 can function as a reception section which receives the position information of the mobile terminal 10 and the information indicating the motion of the user, which are transmitted from the mobile terminal 10, for example.

The correction section 220 is configured from, for example, a CPU (Central Processing Unit), a ROM (Read Only Memory), and a RAM (Random Access Memory), and has a function of correcting the position information indicating the position of the mobile terminal 10.

In general, in the GPS positioning and the measurement of a position using a wireless LAN, there are cases where positioning accuracy is unreliable. In such a case, when pieces of position information (for example, latitude/longitude) of the mobile terminal 10 which are successively measured are plotted, an unstable locus that deviates from an actual movement route of the mobile terminal 10 is rendered. It is not uncommon that the locus largely deviates from the actual movement route of the mobile terminal 10. The correction section 220 is capable of performing the position correction for bringing the unstable locus and the plot deviated from the actual movement route of the mobile terminal 10 closer to the actual movement route of the mobile terminal 10.

FIG. 3 is a diagram showing a configuration example of data used by the correction section 220 of the position correction apparatus 20. As shown in FIG. 3, the data used by the correct ion section 220 of the position correction apparatus 20 includes estimation time, longitude (X-axis)/latitude (Y-axis), action label, positioning method, other information, and the like. The estimation time is time at which the position of the mobile terminal 10 is estimated, and is associated with the longitude (X-axis)/latitude axis) at the time of estimating the longitude (X-axis)/latitude (Y-axis), for example. The timing at which the position of the mobile terminal 10 is estimated is not particularly limited, and, for example, the position of the mobile terminal 10 may be estimated every predetermined time.

The longitude (X-axis)/latitude (Y-axis) is an example of the position information indicating the position of the mobile terminal 10. That is, the form of the position information may be a form using the longitude (X-axis)/latitude (Y-axis), and may also be a form using polar coordinates or a form using a vector. Further, the form of the position information may be three-dimensional coordinates including an altitude. The action label may be acquired by the action label acquisition section 280, and the detail of the action label will be described below. The positioning method shows a method by which the position of the mobile terminal 10 is measured, and examples of the positioning methods include the GPS positioning, the measurement of a position using a wireless LAN. The positioning method is associated with the position information acquired by the positioning at the time of the positioning of the mobile terminal 10, for example.

Examples of other information include positioning accuracy, information for specifying a name, address, and floor of a building to which the position at which the mobile terminal 10 is estimated to exist belongs, and weather and temperature of the position at which the mobile terminal 10 is estimated to exist. The other information is associated with the position information acquired by the positioning at the time of the positioning of the mobile terminal 10, for example. Hereinafter, with reference to FIG. 4, the basic functions of the appropriate range specification section 221 and the position information correction section 222 will be described.

Figure 4:
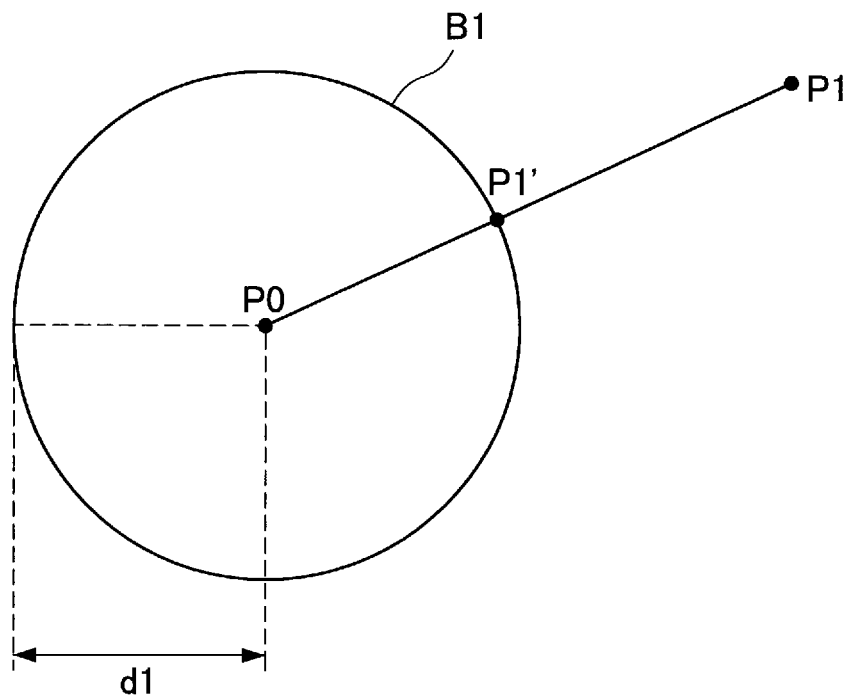
FIG. 4 is a diagram illustrating an example of position correction performed by the position correction apparatus.

FIG. 4 is a diagram illustrating an example of position correction performed by the position correction apparatus. Here, the estimation time is represented by T0 to Tn (n represents a natural number) in order from the earliest to the latest, and the position information at each estimation time is represented by P0 to Pn. As shown in FIG. 4, the appropriate range specification section 221 has a function of specifying an appropriate range having, as a reference, the position information P0 among the pieces of position information P0 to Pn with which the estimation times T0 to Tn are associated, respectively. The appropriate range specification section 221 can specify the inside of a boundary B1 having the position information P0 as a reference as an appropriate range, for example. Although FIG. 4 shows an example in which the boundary B1 is a circle, the boundary B1 is not limited to the circle.

The position information correction section 222 has a function of correcting the position information P1, in the case where the position information P1 is outside the appropriate range specified by the appropriate range specification section 221. In the example shown in FIG. 4, since the position information P1 is outside the appropriate range specified by the appropriate range specification section 221 (outside the boundary B1), the position information correction section 222 corrects the position information P1. The position information correction section 222 may correct the position information P1 so as to have any position information, and, can correct the position information P1 to position information P1' which is the nearest to the position information P1 within the appropriate range, for example. The position information P1' satisfies a theoretical condition of being inside the appropriate range having the position information P0 as a reference, and also satisfies a realistic condition of being the nearest to the position information P1 that is an actual measurement value. Therefore, the position information P1' can be even more appropriate position information as the corrected position information.

In the case where the position information P1 is inside the appropriate range specified by the appropriate range specification section 221, the position information correction section 222 may not correct the position information P1, or may correct the position information P1 inside the appropriate range. In the case where the positioning error of the position information P1 is smaller than predetermined value, the position information correction section 222 may limit the correction of the position information P1 (for example, may not correct the position information P1) even when the position information P1 is outside the appropriate range. Hereinafter, with reference to FIG. 5, the flow of operation related to the basic functions of the appropriate range specification section 221 and the position information correction section 222 will be described.

Figure 5:
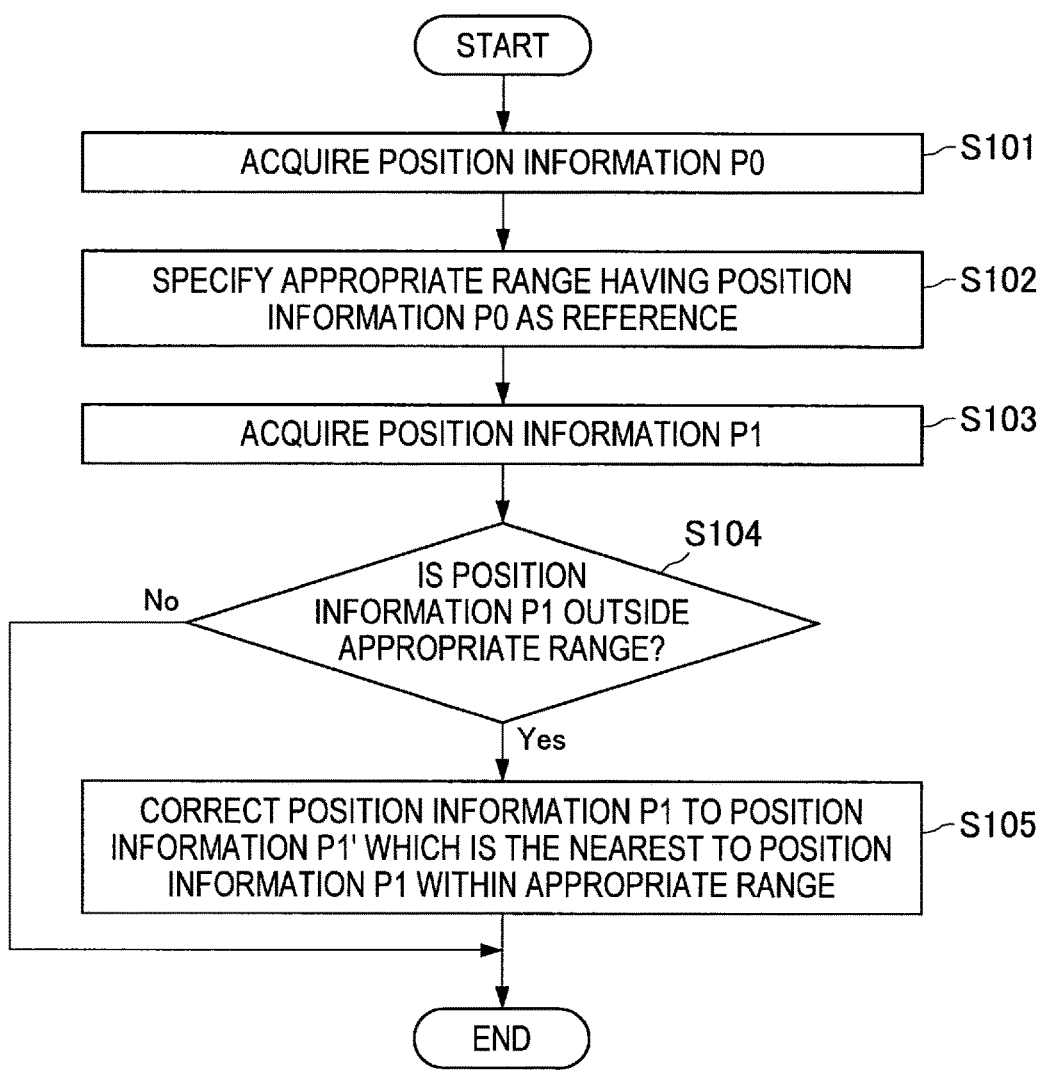
FIG. 5 is a flowchart showing a flow of an example of the position correction performed by the position correction apparatus.

FIG. 5 is a flowchart showing a flow of an example of the position correction performed by the position correction apparatus 20. First, the position information acquisition section 110 acquires position information P0 (S101). Next, the appropriate range specification section 221 specifies the appropriate range having the position information P0 as a reference (S102). Next, the position information acquisition section 110 acquires position information P1 (S103). In the case where the position information P1 is inside the appropriate range ("No" in S104), the position information correction section 222 terminates the position correction.

In the case where the position information P1 is outside the appropriate range ("Yes" in S104), the position information correction section 222 corrects the position information P1 to position information P1' which is the nearest to the position information P1 within the appropriate range (S105), and terminates the position correction. In the position estimation described with reference to FIG. 4 and FIG. 5, the appropriate range having the position information P0 as a reference is specified, and the position information P1 is corrected. Hereinafter, with reference to FIG. 6, an example of the position correction (case of taking account of positioning accuracy) performed by the position correction apparatus 20 when the position correction is successively performed will be described.

Figure 6:
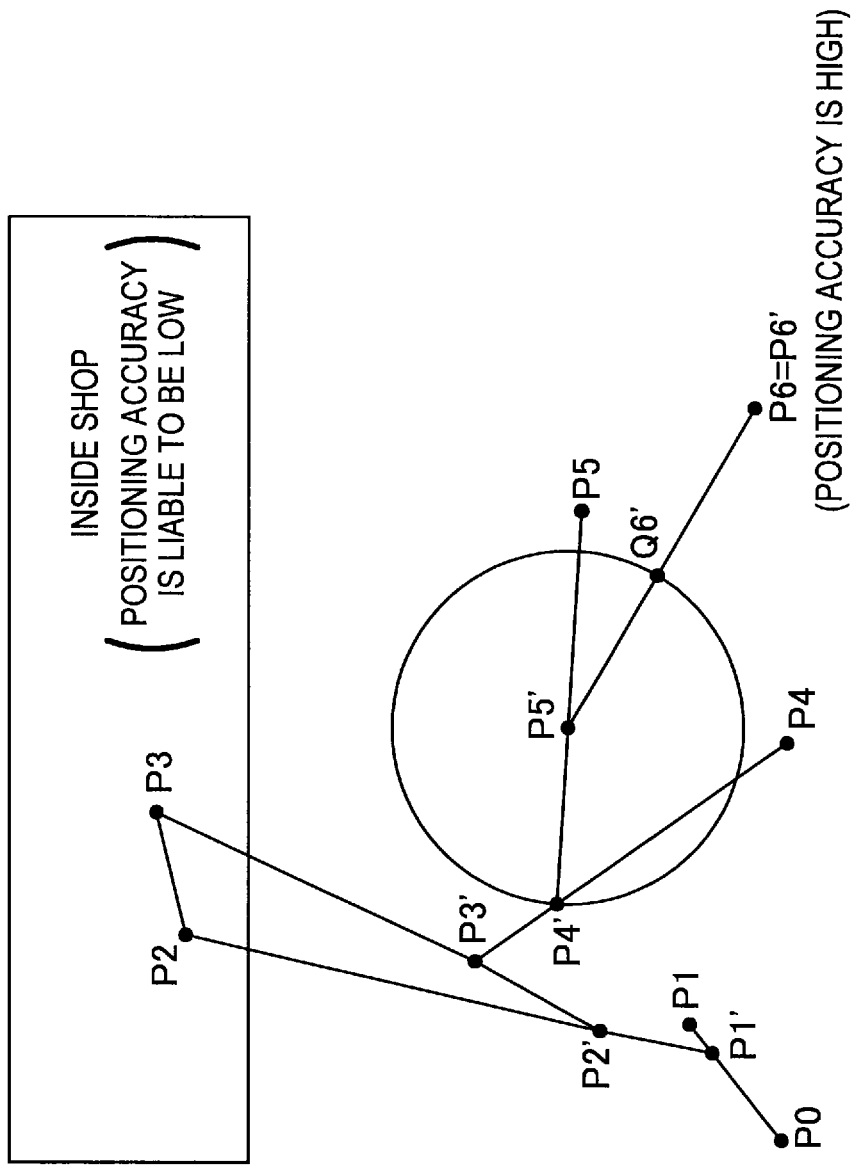
FIG. 6 is a diagram illustrating an example of the position correction (case of taking account of positioning accuracy) performed by the position correction apparatus when the position correction is successively performed.

FIG. 6 is a diagram illustrating an example of the position correction (case of taking account of positioning accuracy) performed by the position correction apparatus 20 when the position correction is successively performed. In the example shown in FIG. 6, the estimation time is represented by T0 to T6 in order from the earliest to the latest, and the position information at each estimation time is represented by P0 to P6. In the example shown in FIG. 6, since the pieces of position information P1 to P5 are outside the appropriate range specified by the appropriate range specification section 221, the position information correction section 222 corrects the pieces of position information P1 to P5 to pieces of position information P1' to P5', respectively.

That is, in general, the appropriate range specification section 221 specifies the appropriate range having position information Pk−1 as a reference, and the position information correction section 222 corrects position information Pk, in the case where the position information Pk is outside the appropriate range (appropriate range having position information Pk−1' as a reference) specified by the appropriate range specification section 221.

Note that there is an issue that it is generally difficult to accurately measure a position at indoor places, areas with many high-rise, facilities, and the like. In the example shown in FIG. 6, the position information P2 and the position information P3 are inside a shop, and hence are the positions that are particularly liable to be low in positioning accuracy. However, the position information P2 and the position information P3 are corrected to position information P2' and position information P3', respectively, by means of the position correction according to the present embodiment, and therefore, the influence caused by the reduction of positioning accuracy can be relieved.

Since there are also cases where the positioning accuracy is unreliable, it is necessary to figure out carefully as to the position information estimated at which estimation time is to be set as P0 (initial value). Accordingly, for example, in the case where positioning accuracy is equal to or more than a predetermined value, the position information correction section 222 can set the position information as P0 (initial value). For example, in the case where the position information is estimated using the GPS positioning, the positioning accuracy may be calculated based on an error in the horizontal direction or the like. Further, in the case where the estimated position of the mobile terminal 10 is not moved from an initial time T0 for a predetermined time period, the position information correction section 222 uses a principal component analysis or the like, thereby ensuring the accuracy.

Further, in the case were the positioning accuracy is enhanced, in order to prevent the positioning error from being continuously accumulated in the value after the correction (hereinafter, may be also referred to as "corrected value" or "corrected value P'"), the position information correction section 222 can also replace the corrected value with the position information. For example, in the case where the positioning accuracy is equal to or more than a predetermined value, the position information correction section 222 can replace the corrected value with the position information whose positioning accuracy is enhanced. Alternatively, in the case where the position information is inside the appropriate range, the position information correction section 222 may replace the corrected value with the position information.

In the example shown in FIG. 6, since position information P6 is outside the appropriate range having position information as a reference, the position information correction section 222 can also correct the position information P6 to position iinformation Q6' which is the nearest to the position information P6 within the appropriate range. However, since the positioning accuracy of the position information P6 is high, the position information correction section 222 can replace the corrected value P' with the position information P6. Hereinafter, with reference to FIG. 7, a flow of an example of the position correction performed by the position correction apparatus 20 when the position correction is successively performed will be described.

Figure 7:
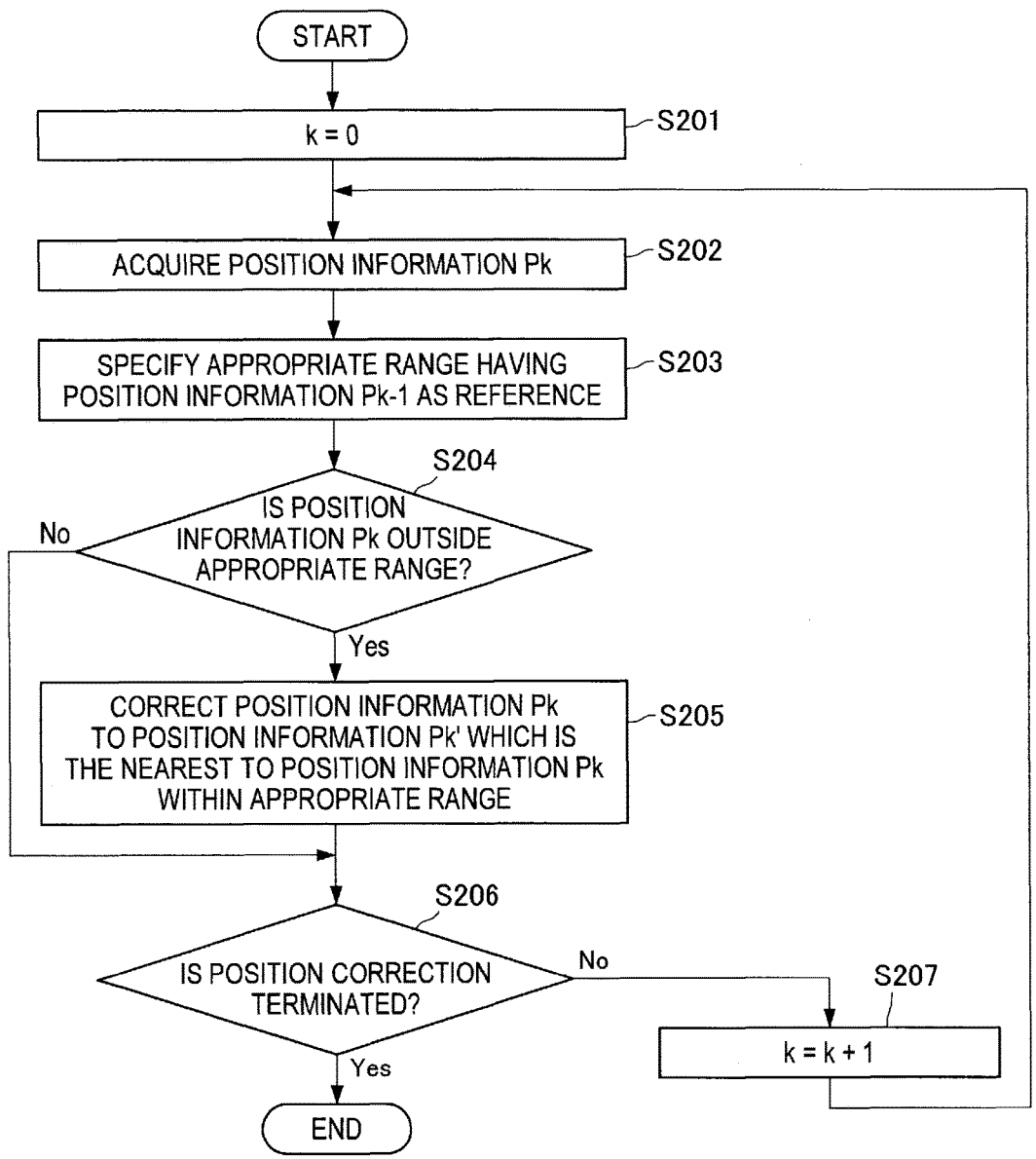
FIG. 7 is a flowchart showing a flow of an example of the position correction performed by the position correction apparatus when the position correction is successively performed.

FIG. 7 is a flowchart showing a flow of an example of the position correction performed by the position correction apparatus 20 when the position correction is successively performed. As shown in FIG. 7, first, the position information acquisition section 110 performs preparation (setting k to 0) for acquiring first position information (S201), and the position information acquisition section 110 acquires position information Pk (S202). Next, the appropriate range specification section 221 specifies an appropriate range having position information Pk−1 as a reference (S203). In the case where the position information Pk is inside the appropriate range ("No" in S204), the position information correction section 222 proceeds to S206, and in the case where the position information Pk is outside the appropriate range ("Yes" in S204), the position information correction section 222 corrects the position information Pk to position information Pk' which is the nearest to the position information Pk within the appropriate range (S205), and proceeds to S206.

In the case of terminating the position correction ("Yes" in S206), the position information correction section 222 terminates the position correction, and in the case of continuing the position correction ("No" in S206), the position information correction section 222 performs preparation (adding 1 to k) for acquiring the next position information (S207), and returns to S202. Heretofore, there has been described the flow of an example of the position correction performed by the position correction apparatus 20 when the position correction is successively performed. Hereinafter, with reference to FIG. 8, a flow of an example of the position correction (case of taking account of positioning accuracy) performed by the position correction apparatus 20 when the position correction is successively performed will be described.

Figure 8:
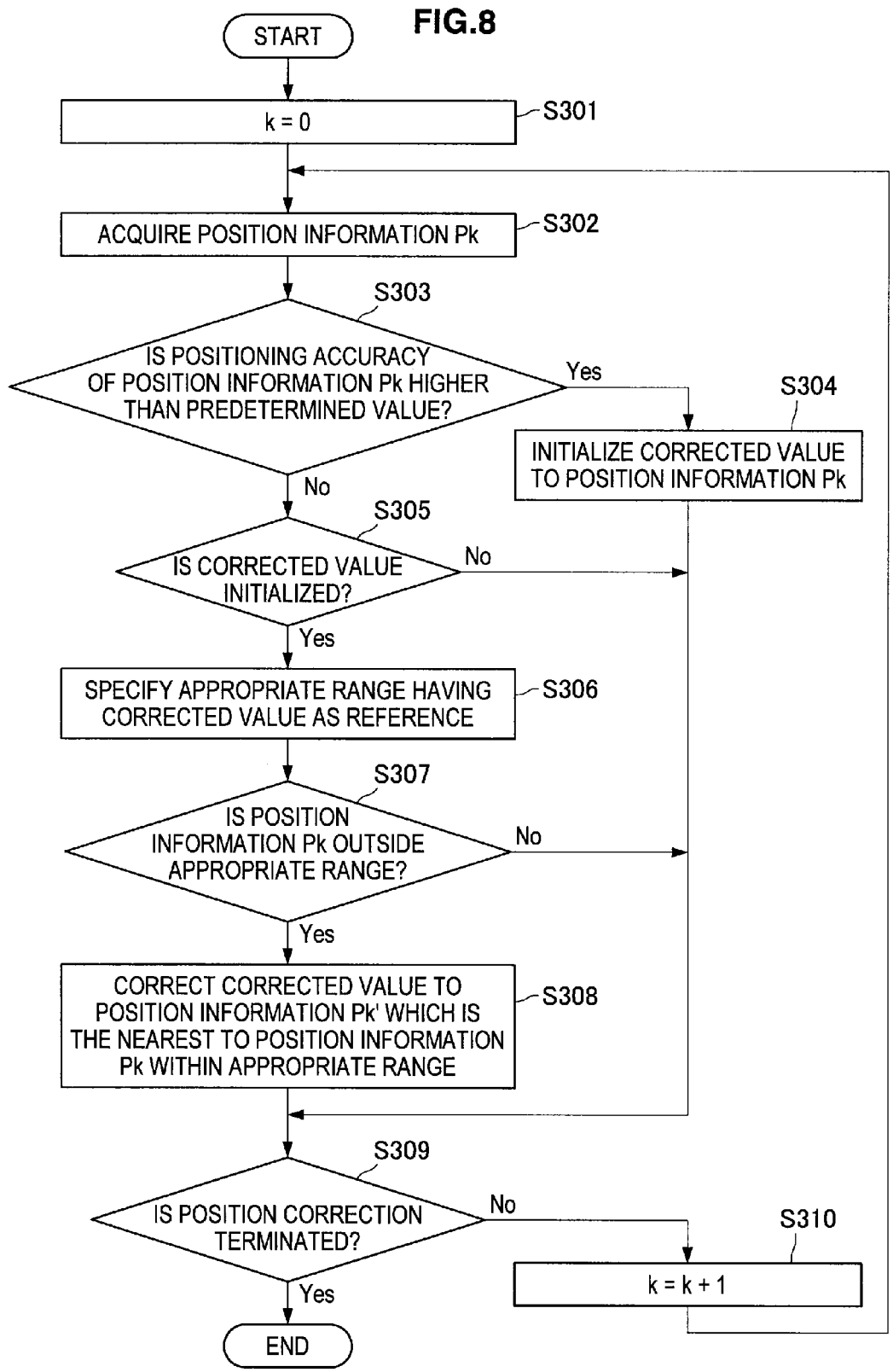
FIG. 8 is a flowchart showing a flow of an example of the position correction (case of taking account of positioning accuracy) performed by the position correction apparatus when the position correction is successively performed.

FIG. 8 is a flowchart showing a flow of an example of the position correction (case of taking account of positioning accuracy) performed by the position correction apparatus 20 when the position correction is successively performed. As shown in FIG. 8, first, the position information acquisition section 110 performs preparation (setting k to 0) for acquiring first position information (S301), and the position information acquisition section 110 acquires position information Pk (S302). Next, in the case where the positioning accuracy of the position information Pk is higher than a predetermined value (in the case where the positioning error of the position information Pk is smaller than a predetermined value) ("Yes" in S303), the position information correction section 222 initializes a corrected value P' to the position information Pk (S304), and proceeds to S309.

In the case where the positioning accuracy of the position information Pk is smaller than the predetermined value (in the case where the positioning error of the position information Pk is larger than the predetermined value) ("No" in S303), the position information correction section 222 proceeds to S305. In the case where the corrected value P' is not initialized ("No" in S305), the position information correction section 222 proceeds to S309. In the case where the corrected value P° is initialized ("Yes" in S305), the appropriate range specification section 221 specifies an appropriate range having the corrected value P' as a reference (S306).

In the case where the position information Pk is inside the appropriate range ("No" in S307), the position information correction section 222 proceeds to S309, and in the case where the position information Pk is outside the appropriate range ("Yes" in S307), the position information correction section 222 corrects the corrected value P' to position information Pk' which is the nearest to the position information Pk within the appropriate range (S308), and proceeds to S309.

In the case of terminating the position correction ("Yes" in S309), the position information correction section 222 terminates the position correction, and in the case of continuing the position correction ("No" in S309), the position information correction section 222 performs preparation (adding 1 to k) for acquiring the next position information (S310), and returns to S302. Heretofore, there has been described the flow of an example, of the position correction (case of taking account of positioning accuracy) performed by the position correction apparatus 20 when the position correction is successively performed.

Incidentally, it is as described above that the appropriate range specification section 221 can specify the inside of the boundary B1 having the position information Pk-1 as a reference as the appropriate range, for example. However, as the technique of specifying the appropriate range performed by the appropriate range specification section 221, many other techniques can be adopted. For example, the appropriate range specification section 221 may specify the appropriate range based on a plurality of pieces of position information Pk-1, Pk-2, . . . , Pk-m of the past. Hereinafter, with reference to FIG. 9, an example of the position correction (case of using road information) performed by the position correction apparatus 20 will be described.

FIG. 9 is a diagram illustrating an example of the position correction (case of using road information) performed by the position correction apparatus 20. As shown in FIG. 9, in the case where pieces of position information P0 to Pn each represent a position of the mobile terminal 10 of the user, the appropriate range specification section 221 may specify an appropriate range based on road information C' indicating a position at which a road exists. For example, the appropriate range specification section 221 may specify, as the appropriate range, the position at which the road exists indicated by the road information C'. In order to specify the position at which the road exists indicated by the road information C' as the appropriate range, there can be adopted a general map matching technique that is used in a car navigation system and the like, for example.

Further, the appropriate range specification section 221 may specify, as the appropriate range, the position at which the road exists indicated by the road information C' and the inside of a boundary Bt having position information Pt-1 as a reference. In the example shown in FIG. 9, the appropriate range specification section 221 specifies, as the appropriate range, the position at which the road exists indicated by the road information C' and the inside of the boundary Bt having the position information Pt-1 as a reference. In this case, since position information Pt is outside the appropriate range, the position information correction section 222 corrects the position information Pt to position information Pt' which is the nearest to the position information Pt within the appropriate range.

Note that, although in the example shown in FIG. 9, the appropriate range is specified based on the road information C' indicating a position at which a road exists, the appropriate range may also be specified based on road information or railway information indicating a position at which a railway track exist. That is, the appropriate range specification section 221 can specify the appropriate range based on route information indicating a position at which a route such as a road or a railway track exists. Heretofore, there has been described an example of the position correction (case of using road information) performed by the position correction apparatus 20. Hereinafter, with reference to FIG. 10, an example of the position correction (case of using information indicating a motion of a user) performed by the position correction apparatus 20 will be described.

FIG. 10 is a diagram illustrating an example of the position correction (case of using information indicating a motion of a user) performed by the position correction apparatus 20. As shown in FIG. 10, in the case where pieces of position information P0 to Pn each represent a position of the mobile terminal 10 of the user, the appropriate range specification section 221 may specify an appropriate range based on information indicating the motion of the user detected by the detection section 130 of the mobile terminal 10. For example, in the case where the detection section 130 is configured from a geomagnetic sensor, the appropriate range specification section 221 can specify the appropriate range based on the movement direction of the user detected by the geomagnetic sensor.

For example, in the case where the movement direction of the user is "northeast direction", the appropriate range specification section 221 can specify a region of the first quadrant having position information Pt-1 as a reference as the appropriate range. Further, compared to the case where the movement direction of the user is only "northeast direction", in the case where the movement direction of the user changes in the order of "northeast direction", "southwest direction", and "northeast direction", the appropriate range specification section 221 can specify a smaller region of the first quadrant having the position information Pt-1 as a reference as the appropriate range.

Further, the appropriate range specification section 221 may specify, as the appropriate range, the appropriate range specified based on the information indicating the motion of the user detected by the detection section 130 of the mobile terminal 10, and the inside of the circle with radius D having position information Pt-1 as a reference. For example, in the case where the movement direction of the user is only "northeast direction", the appropriate range specification section 221 can specify, as the appropriate range, a region of the first quadrant having the position information Pt-1 as a reference and the inside, of the circle with radius D having the position information Pt-1 as a reference.

In the example shown in FIG. 10, there is assumed a case where the movement direction of the user changes in the order of "northeast direction", "southwest direction", and "northeast direction", and hence, the appropriate range specification section 221 specifies, as appropriate range C2', the small region of the first quadrant having the position information Pt−1 as a reference and the inside of the circle with radius D having the position information Pt−1 as a reference. In this case, since position information Pt is outside the appropriate range, the position information correction section 222 corrects the position information Pt to position information Pt' which is the nearest to the position information Pt within the appropriate range. Heretofore, there has been described an example of the position correction (case of using information indicating a motion of a user) performed by the position correction apparatus 20.

As the technique of specifying the appropriate range performed by the appropriate range specification section 221, there may be assumed another technique. For example, in the case where pieces of position information P0 to Pn each represent a position of the mobile terminal 10 of the user, the appropriate range specification section 221 can also specify the appropriate range based on time information formed by associating time at which a vehicle is expected to reach a station with position information of the station. For example, in the case where the time at which a vehicle is expected to reach a station is inside a predetermined range having an estimation time as a reference, the appropriate range specification section 221 can also specify the position information of the station as the appropriate range.

The time information may be stored in the storage section 260 of the position correction apparatus 20, or may be stored in another apparatus. Further, the time information may be updated on a real-time basis, and in the case where a delay occurs in a vehicle service, the appropriate range specification section 221 can also specify the appropriate range based on the time information in which the delayed state is reflected. Hack to FIG. 2, the description on the function of the position correction apparatus 20 will be continued.

The action label acquisition section 280 is configured from, for example, a CPU, a ROM, and a RAM, and has a function of acquiring an action label indicating an action of the user holding the mobile terminal 10. As the technique of recognizing the action of the user holding the mobile terminal 10, the technology disclosed in JP 2006-3452691 as described above can be adopted, for example. According to such technology, for example, the motion of the user holding the mobile terminal 10 is detected by the detection section 130, and the detected motion is analyzed by the action label acquisition section 280, then the action of the user is recognized.

However, the technique of acquiring the action label performed by the action label acquisition section 280 is not limited to such an example. For example, in the case where the input of an action label from the user is accepted by the input section 270, the action label acquisition section 280 may acquire the action label, the input from the user of which is accepted by the input section 270. In the example shown in FIG. 2, although the action label acquisition section 280 is included in the position correction apparatus 20, the action label acquisition section 280 may also be included in the mobile terminal 10 instead of the position correction apparatus 20.

The selection section 290 is configured from, for example, a CPU, a ROM, and a RAM, and has a function of selecting an algorithm for position correction, based on the action label acquired by the action label acquisition section 280. The selection section 290 may select the algorithm based on the action label and a predetermined selection condition. Examples of the selection of the algorithm based on the action label and the predetermined select or condition will be described with reference to FIG. 11.

FIG. 11 is a diagram showing an example of data used for algorithm selection performed by the position correction apparatus 20. The data is stored in the storage section 260, for example, and is used for the selection of an algorithm performed by the selection section 290. The predetermined selection condition may include at least one of attribute information of the user holding the mobile terminal 10 or an environment in which the user holding the mobile terminal 10 is present. Further, the predetermined selection condition may also be a type of the sensor which has detected the data used for the action recognition, a positioning method used for the position estimation of the mobile terminal 10, and the like.

In the example shown in FIG. 11, "weather", "environment information", and "transportation means" are examples of the environment in which the user holding the mobile terminal 10 is present. As other examples of the environment in which the user is present, there are assumed "city/suburb", "land/sea/river", "season", "temperature", and "time period". The selection section 290 may acquire the environment in which the user holding the mobile terminal 10 is present from a web server, based on the position information of the mobile terminal 10. Alternatively, selection section 290 may acquire the environment in which the user holding the mobile terminal 10 is present from the information stored in the storage section 260 in advance, based on the position information of the mobile terminal 10. In addition, the selection section 290 can also acquire the environment in which the user holding the mobile terminal 10 is present based on the action label.

Examples of the attribute information of the user include "sex", "age", "companion", "unmarried/married", "purpose of action", and "way of carrying mobile terminal 10". The selection section 290 can acquire information input by the use to the mobile terminal 10 as the attribute information of the user. The acquired attribute information of the user can also be stored in the storage section 260 with control performed by the control section 250. The selection section 290 can select an algorithm having larger appropriate range, as the action label indicates an action accompanying faster movement, for example. For example, since it is assumed that the speed of the movement that accompanies the action of the user becomes faster as the actions are changed in the order of rest, shopping, movement by foot, movement bicycle, and movement by car (or movement by train), an algorithm having a larger appropriate range can be selected.

Further, since it is assumed that the speed of the movement of the user decreases as "weather" among the selection conditions is changed in the order of "sunny", "cloudy" "rainy" "snowy", for example, the selection section 290 can select an algorithm having a smaller appropriate range. In addition, since it is assumed that the speed of the movement decreases when "environment information" is "unpaved road" compared to the case where the "environment information" is "paved road", the selection section 290 can select an algorithm having a smaller appropriate range. Hereinafter, an example of the position correction in accordance with the thus selected algorithm will be described.

Figure 12:
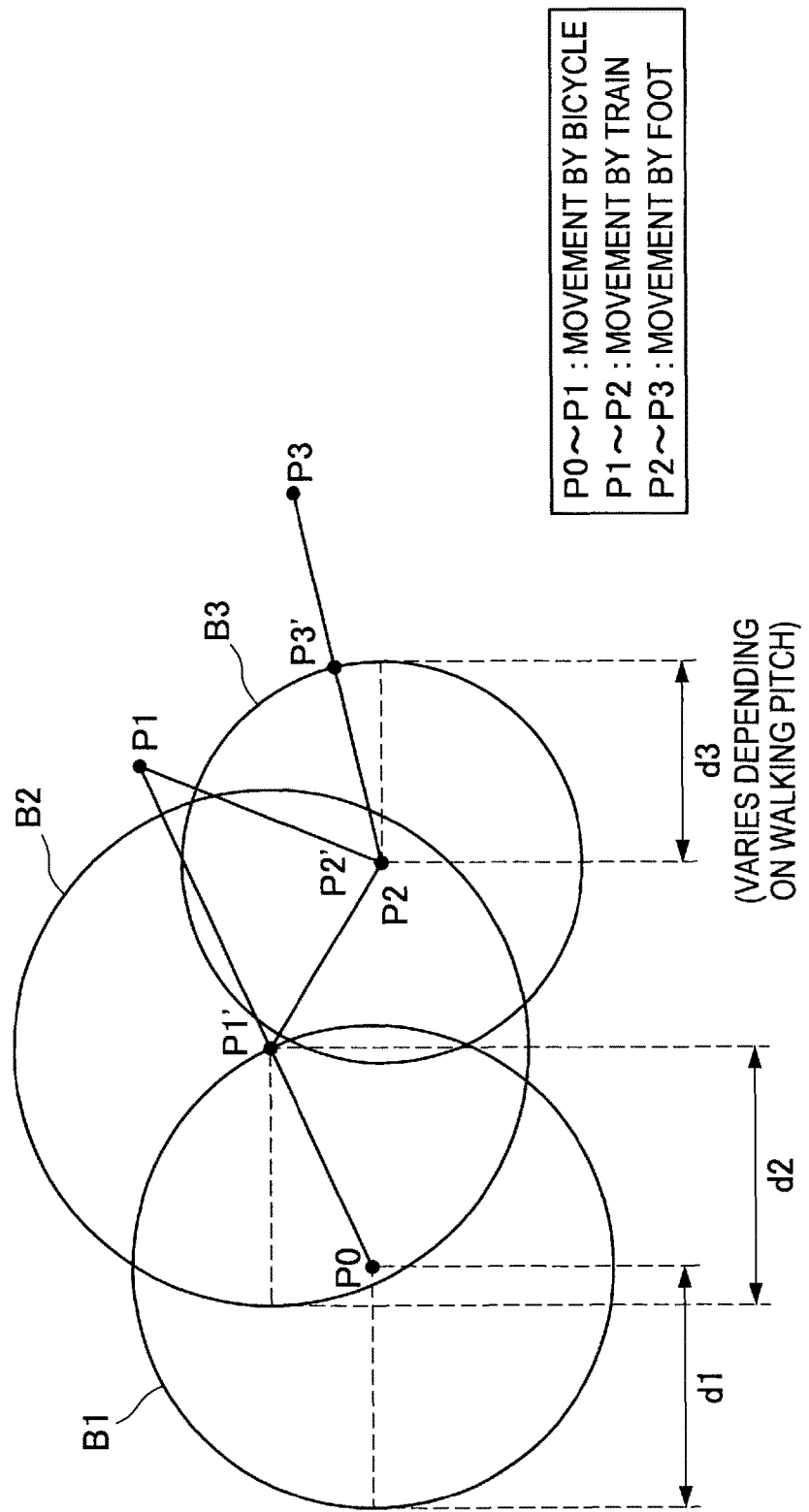
FIG. 12 is a diagram illustrating an example of the position correction (case of using action label) performed by the position correction apparatus.

FIG. 12 is a diagram illustrating an example of the position correction (case of using action label) performed by the position correction apparatus 20. The correction section 220 can correct the position information of the mobile terminal 10 in accordance with the algorithm selected by the selection section 290. In this case, as described above, the specification of the appropriate range and the correction of the position information may be performed by the appropriate range specification section 221 and the position information correction section 222, respectively.

That is, the appropriate range specification section 221 can specify the appropriate range having position information P0 as a reference in accordance with the algorithm selected by the selection section 290. The position information correction section 222 can correct position information Pk+1, the estimation time of which is after that of position information Pk, in the case where the position information Pk+1 is outside the appropriate range specified by the appropriate range specification section 221.

As shown in FIG. 12, the position information correction section 222 can also specify, as the appropriate range, the inside of the circle having the position information Pk as a reference, with a radius having a length designated by the algorithm selected by the selection section 290. For example, let us assume that the action of the user from the position information P0 to the position information P1 is "movement by bicycle", the action of the user from the position information P1 to the position information P2 is "movement by train", and the action of the user from the position information P2 to the position information P3 is "movement by foot".

In this case, the selection section 290 can specify, as appropriate ranges, the inside of the circles (boundaries B1, B2, and B3) having pieces of position information P0, P1', and P2' as references, with radii d1, d2, and d3 having lengths designated by the algorithms selected by the selection section 290, respectively. Note that, since it is assumed that the speed of the movement becomes faster as the action of the user is changed in the order of "movement by foot", "movement by bicycle", and "movement by train", a larger appropriate range is designated by the algorithm. That is, the relationship of the radii in the respective algorithms is designated as d3<d1<d2.

Note that, for example, in the case where the action of the user is "movement by foot", the appropriate range specification section 221 can detect the walking pitch of the user based on information indicating the motion of the user detected by the detection section 130. Accordingly, in the cane were the walking pitch of the user is detected, the appropriate range specification section 221 can also change the radius in accordance with the walking pitch as shown in FIG. 12. For example, the appropriate range specification section 221 can specify the appropriate range as follows: "walking pitch (about 2 Hz, in the case of male adult)×step length (about 70 cm, in the case of male adult)=radius (about 1.4 m/sec, in the case of male adult)".

Further, when the action of the user is "rest", there is a case where, even though the user actually does not move, there is a block in which it seems as if the user is moving. In the case where the action of the user is "rest", the appropriate range specification section 221 calculates an elliptical range indicating plot distribution of the block, and the position information correction section 222 may correct the position information such that all pieces of position information included in the block are contained in the ellipse. For the calculation of the elliptical range, the appropriate range specification section 221 may determine a covariance matrix with respect to X and Y coordinates of each piece of position information, and may calculate a characteristic vector and a characteristic value (principal component analysis), for example.

In addition, for example, in the case where the action of the user is "movement by train", the appropriate range specification section 221 can also specify the appropriate range by setting the radius to a length based on the movement speed of the train. That is, the appropriate range specification section 221 can also specify the appropriate range by setting the radius to a length based on a movement speed for each action, for example. The length based on the movement speed for each action is designated by the algorithm corresponding to each action label, for example.

In addition thereto, there are various techniques as the technique for specifying an appropriate range using an action label performed by the appropriate range specification section 221. For example, in the case where the action label indicates a state available for the movement on a route (road, railway track, and the like), the appropriate range specification section 221 may specify the appropriate range based on route information indicating a position at which the route exists. For example, in the case where the action label indicates a state available for the movement on a road, the appropriate range specification section 221 may specify the appropriate range based on the road information indicating a position at which the road exists. As the case where the action label indicates the state available for the movement on the road, there are assumed cases where the actions of the user are "movement by foot", "movement by bicycle", "movement by car", and "movement by bus", for example. For example, the appropriate range specification section 221 can specify, as the appropriate range, the position at which the road exists, which is indicated by the road information. The specification of the appropriate range based on the road information may be executed as described with reference to FIG. 9.

In the case where the action label indicates a state available for the movement on a railway track, the appropriate range specification section 221 may specify the appropriate range based on railway information indicating a position at which the railway track exists. As the case where the action label indicates the state available for the movement on the railway track, there is assumed a case where the action of the user is "movement by train", for example. For example, the appropriate range specification section 221 can specify, as the appropriate range, the position at which the railway track exists, which is indicated by the railway information. The specification of the appropriate range based on the railway information may be executed as described above.

In the case where the action label indicates a state of moving on a vehicle, the appropriate range specification section 221 may specify the appropriate range based on time information formed by associating time at which the vehicle is expected to reach a station with position information of the station. As the case where the action label indicates the state of moving on a vehicle, there are assumed cases where the actions of the user are "movement by bus", "movement by train", for example. The specification of the appropriate range based on the time information may be executed as described above.

Back to FIG. 2, the description on the function of the position correction apparatus 20 will be continued. The control section 250 has a function of controlling the entire operation of the position correction apparatus 20. The display section 240 has a function of displaying various types of information based on the control performed by the control section 250. For example, the display section 240 can display the position information before the correction or the position information after the correction, based on the control performed by the control section 250. Further, for example, the display section 240 can also display the position information before the correction or the position information after the correction side by side, based on the control performed by the control section 250.

The input section 270 has a function of accepting input of various types of operations from the user. Accordingly, in the case where the input section 270 accepts the input of operation to display the position information after the correction, for example, the control section 250 can control the display section 240 such that the position information after the correction is displayed. Further, in the case where the input section 270 accepts the input of operation to display the position information before the correction, for example, the control section 250 controls the display section 240 such that the position information before the correction is displayed.

The input section 270 can also accept input of position information and an algorithm from the user. In this case, when the correction section 220 corrects the position information, the control section 250 is capable of performing control such that the algorithm the input of which is accepted from the user is applied to the position information the input of which is accepted from the user. The display section 240 can also re-display, as the position information after the correction, the position information which is corrected by applying thereto the algorithm the input of which is accepted from the user.

The storage section 260 may be configured from, for example, a non-transitory computer-readable medium such as a magnetic storage device such as an HOD (Hard Disk Drive), a semiconductor storage device, an optical storage device, or a magneto-optical storage device, and may store various types of information, various types of programs, and the like. The storage section 260 can also store the position information before the correction and the position information after the correction based on the control performed by the control section 250, for example.

Figure 13:
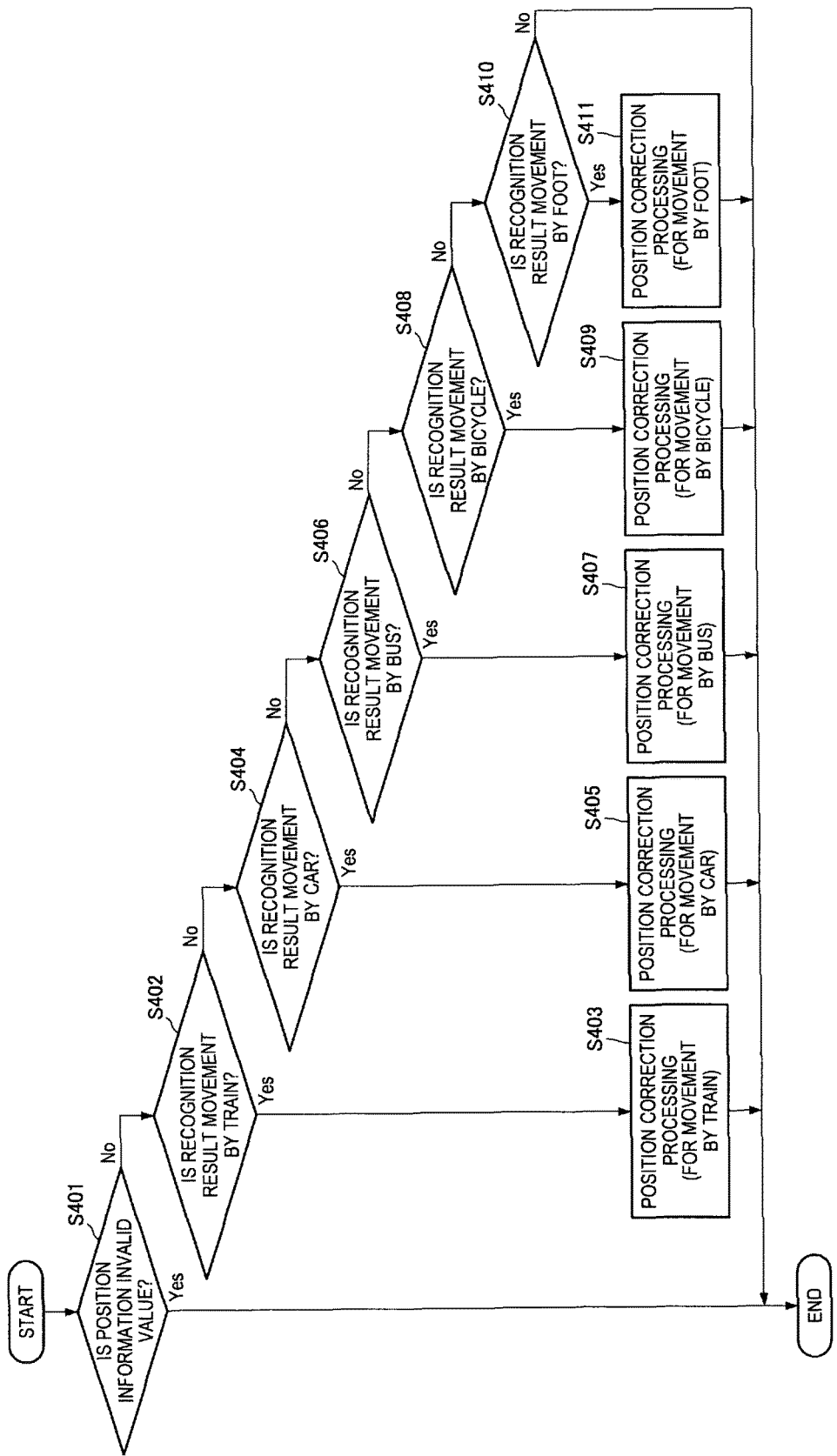
FIG. 13 is a flowchart showing a flu of an example of the position correction (case of using action label) performed by the position correction apparatus.

Hereinafter, with reference to FIG. 13, an example of the position correction performed by the position correction apparatus 20 in the case of using an action label will be described. FIG. 13 is a flowchart showing a flow of an example of the position correction (case of using action label) performed by the position correction apparatus 20. First, in the case where the position information of the mobile terminal 10 is an invalid value ("Yes" in S401), the selection section 290 terminates the position correction. In the case where the position information of the mobile terminal 10 is a valid value ("No" in S401), the selection section 290 proceeds to S402.

Next, in the case where an action recognition result obtained by the action label acquisition section 280 is "movement by train" ("Yes" in S402), the selection section 290 selects an algorithm of the position correction processing for the movement by train, and the correction section 220 performs position correction processing in accordance with the selected algorithm (S403) and terminates the position correction. In the case where the action recognition result obtained by the action label acquisition section 280 is not "movement by train" ("No" in S402), the selection section 290 proceeds to S404.

Next, in the case where the action recognition result obtained by the action label acquisition section 280 is "movement by car" ("Yes" in S404), the selection section 290 selects an algorithm of the position correction processing for the movement by car, and the correction section 220 performs position correction processing in accordance with the selected algorithm (S405) and terminates the position correction. In the case where the action recognition result obtained by the action label acquisition section 280 is not "movement by car" ("No" in S404), the selection section 290 proceeds to S406.

Next, in the case where the action recognition result obtained by the action label acquisition section 280 is "movement by bus" ("Yes" in S406), the selection section 290 selects an algorithm of the position correction processing for the movement by bus, and the correction section 220 performs position correction processing in accordance with the selected algorithm (S407) and terminates the position correction. In the case where the action recognition result obtained by the action label acquisition section 280 is not "movement, by bus" ("No" in S406), the selection section 290 proceeds to S408.

Next, in the case were the action recognition result obtained by the action label acquisition section 280 is "movement by bicycle" ("Yes" in S408), the selection section 290 selects an algorithm of the position correction processing for the movement by bicycle, and the correction section 220 performs position correction processing in accordance with the selected algorithm (S409) and terminates the position correction. In the case where the action recognition result obtained by the action label acquisition section 280 is not "movement by bicycle" ("No" in S408), the selection section 290 proceeds to S410.

Next, in the case where the action recognition result obtained by the action label acquisition section 280 is "movement by foot" ("Yes" in S410), the selection section 290 selects an algorithm of the position correction processing for the movement by foot, and the correction section 220 performs position correction processing in accordance with the selected algorithm (S411) and terminates the position correction. In the case where the action recognition result obtained by the action label acquisition section 280 is not "movement by foot" ("No" in S410), the selection section 290 terminates the position correction.

(Effects Obtained when Position Correction Apparatus is Applied to Various Types of Positioning Technology)

Figure 14:
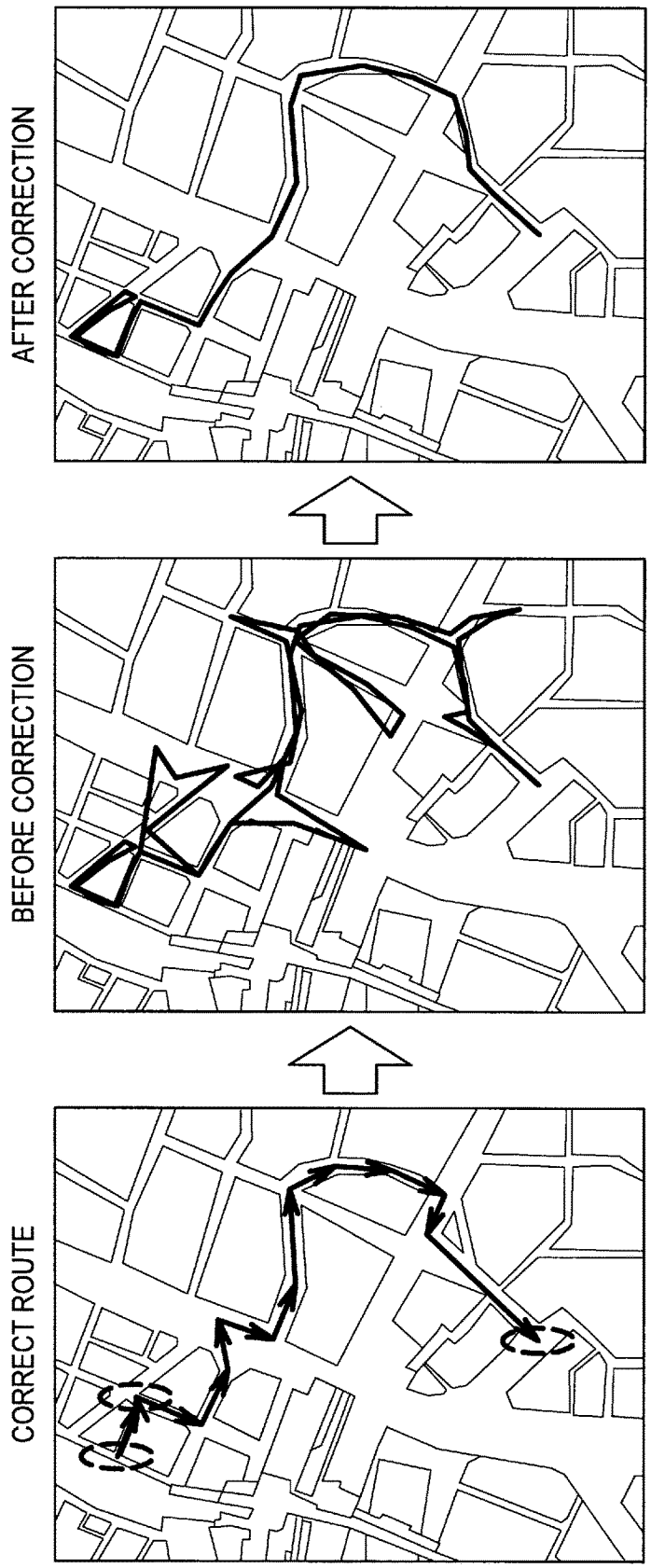
FIG. 14 is a diagram showing an example of a correction result in the case where the position correction performed by the position correction apparatus according to the present embodiment is applied to positioning technology based on a signal from a base station of a wireless LAN.
Figure 15:
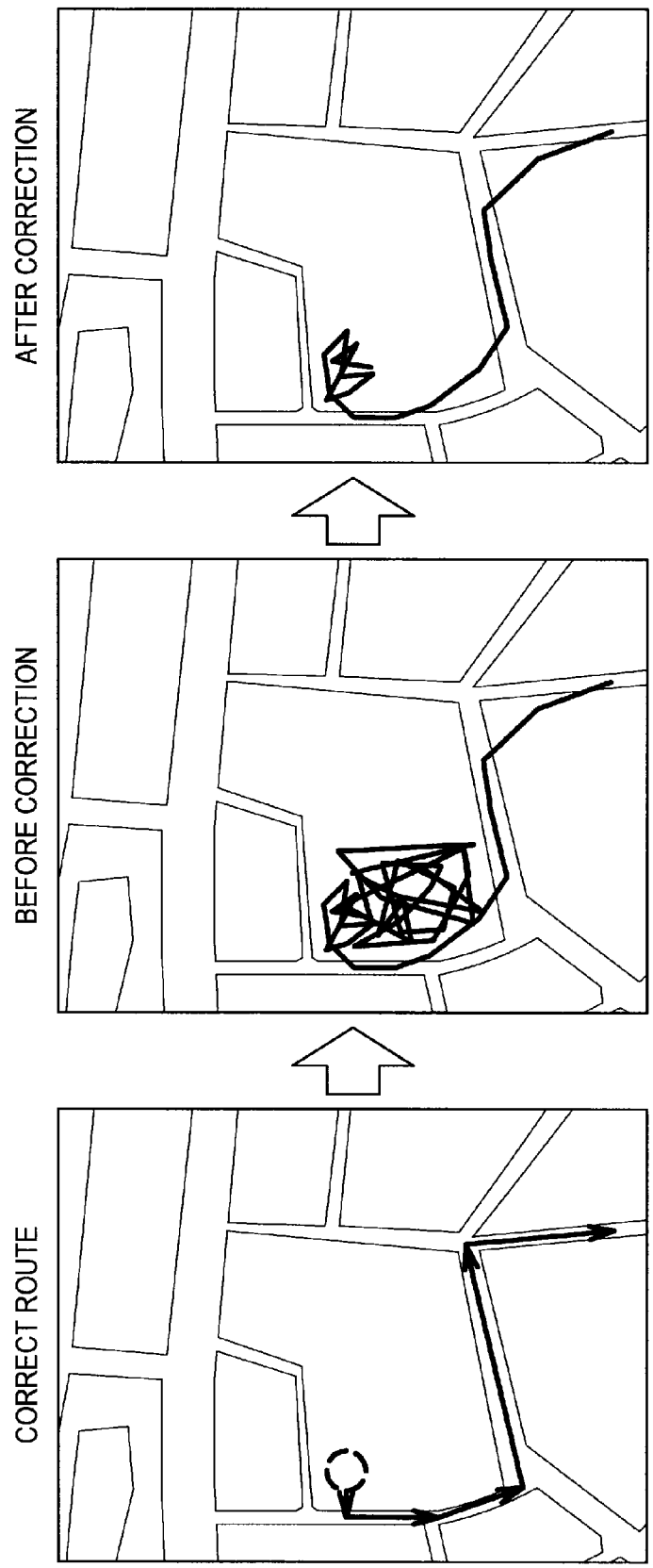
FIG. 15 is a diagram showing an example of a correction result in the case where the position correction performed by the position correction apparatus according to the present embodiment is applied to GPS positioning technology.

Heretofore, an example of the position correction performed by the position correction apparatus 20 in the case of using an action label has been described. Hereinafter, with reference to FIG. 14 and FIG. 15, there will be described examples of correction results in the case where the position correction performed by the position correction apparatus 20 according to the present embodiment is applied to various types of positioning technology. FIG. 14 is a diagram showing an example of a correction result in the case where the position correction performed by the position correction apparatus 20 according to the present embodiment is applied to positioning technology based on a signal from a base station of a wireless LAN. FIG. 15 is a diagram showing an example of a correction result in the case where the position correction performed by the position correction apparatus 20 according to the present embodiment is applied to GPS positioning technology.

In FIG. 14 and FIG. 15, "correct route" shows a route on which the user holding the mobile terminal 10 has actually moved. "Before correction" shows a movement route of the mobile terminal 10 before the position correction apparatus 20 according to the present embodiment performs the position correction. "After correction" shows a movement route of the mobile terminal 10 after the position correction apparatus 20 according to the present embodiment has performed the position correction. As shown in each of FIG. 14 and FIG. 15, after the position correction performed by the position correction apparatus 20, there is no fluctuation of the movement route and the position information of the mobile terminal 10 is acquired highly accurately, compared to before the position correction performed by the position correction apparatus 20.

(Hardware Configuration of Position Correction Apparatus)

Figure 16:
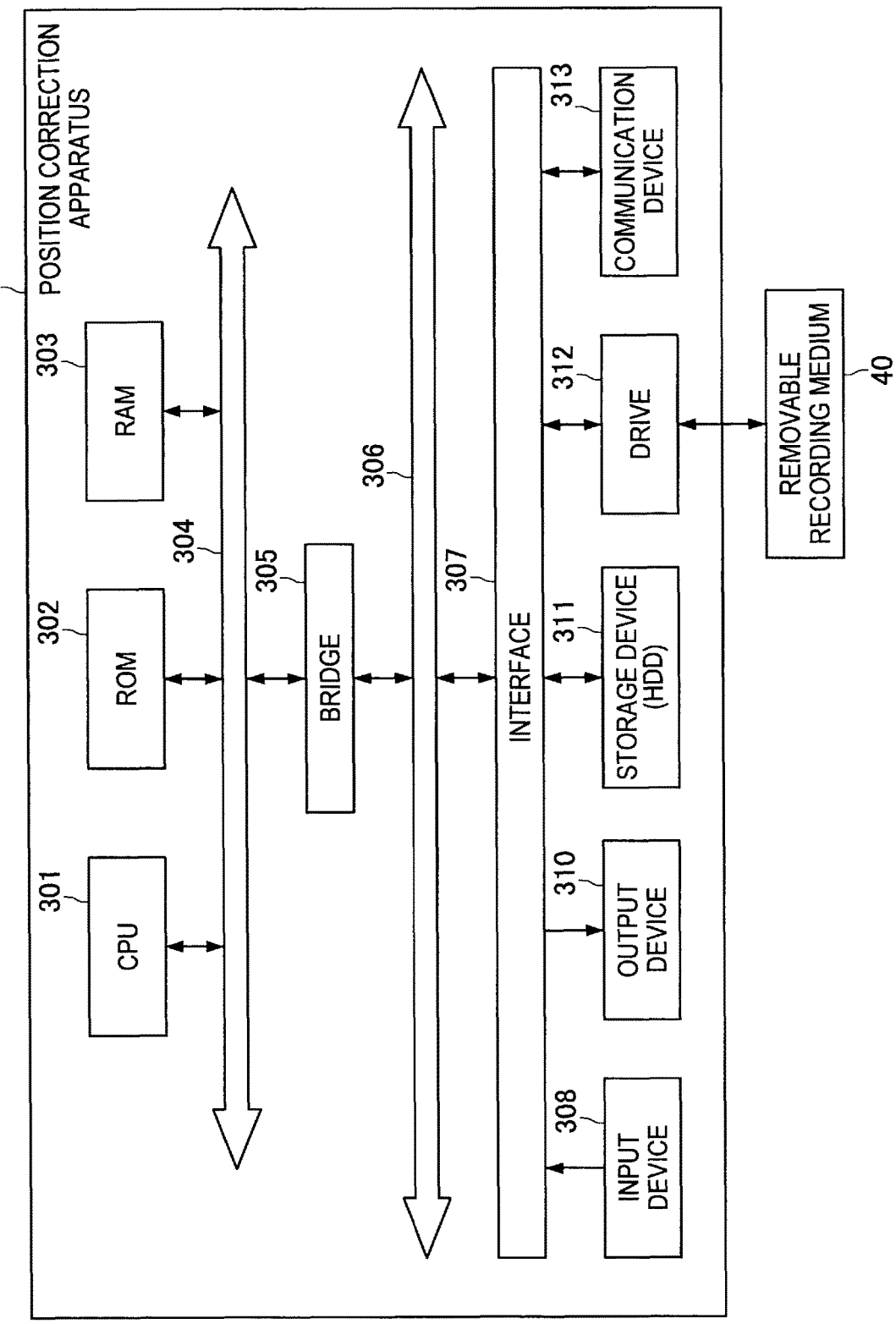
FIG. 16 is a block diagram showing an example a hardware configuration of the position correction apparatus.

FIG. 16 is a block diagram showing a hardware configuration of the position correction apparatus 20. The position correction apparatus 20 includes a CPU 301, a ROM 302, a RAM 303, and a host bus 304. Further, position correction apparatus 20 includes a bridge 305, an external bus 306, an interface 307, an input device 308, an output device 310, a storage device (HUD) 311, a drive 312, and a communication device 313.

The CPU 301 functions as an arithmetic processing unit and a control unit, and controls entire operation of the position correction apparatus 20 in accordance with various programs. Further, the CPU 301 may be a microprocessor. The ROM 302 stores a program, a calculation parameter, and the like used by the CPU 301. The RAM 303 temporarily stores a program used in execution of the CPU 301, a parameter varying as appropriate during the execution, and the like. They are connected with each other via the host bus 304 configured from a CPU bus or the like.

The host bus 304 is connected to the external bus 306 such as a PCI (Peripheral Component Interconnect/Interface) bus via the bridge 305. Note that it is not necessary that the host bus 304, the bridge 305, and the external bus 306 be configured separately, and the functions thereof may be implemented in one bus.

The input device 308 is configured from, for example, input, means for inputting information by a user, such as a mouse, a keyboard, a touch panel, a button, a microphone, a switch, and a lever, and an input, control circuit which generates an input signal based on the input by the user and outputs the generated input signal to the CPU 301. The user of the position correct ion apparatus 20 can input various types of data to the position correction apparatus 20 and can instruct the position correction apparatus 20 to perform a processing operation by operating the input device 308.

The output device 310 includes, for example, display devices such as a CRT (Cathode Ray Tube) display device, a liquid crystal display (LCD) device, an OLED (Organic Light Emitting Diode) device, and a lamp. Further, the output device 310 includes audio output devices such as a speaker and headphones. The output device 310 outputs reproduced content, for example. Specifically, the display device displays various types of information such as reproduced video data using a text or an image. On the other hand, the audio output device converts reproduced audio data and the like into audio and outputs the converted audio.

The storage device 311 is a device for storing data, which is configured as an example of the storage section of the position correction apparatus 20 according to the present embodiment. The storage device 311 may include, for example, a storage medium, a recording device for recording data in the storage medium, a reading device for reading out the data from the storage medium, and a deletion device for deleting the data recorded in the storage medium. The storage device 311 is configured from an HDD (Hard Disk Drive), for example. The storage device 311 drives a hard disk and stores a program and various types of data executed by the CPU 301.

The drive 312 is a reader/writer for the storage medium and is built in or externally attached to the position correction apparatus 20. The drive 312 reads out information recorded in a removable recording medium 40 which is mounted thereto, such as a magnetic disk, an optical disk, a magneto-optical disk, or a semiconductor memory, and outputs the information to the RAM 303. Further, the drive 312 can also write information on the removable recording medium 40.

The communication device 313 is a communication interface which is configured from, for example, a communication device for establishing a connection with a network 30. The communication device 313 may be a wireless LAN (Local Area Network) enabled communication device, an LTE (Long Term Evolution) enabled communication device, or a wired communication device for performing wired communication.

<2. Conclusion>

As described above, according to the position correction apparatus 20 of the embodiment of the present disclosure, it is possible to improve the reliability of the position estimation by using the functions of the appropriate range specification section 221 and the position information correction section 222. In addition, according to the position correction apparatus 20 of the embodiment of the present disclosure, it becomes possible to acquire the position information of the mobile terminal 10 based on the action of the user by using the functions of the action label acquisition section 280, the selection section 290, and the correction section 220.

It should be understood by those skilled in the art that various modifications, combinations, sub-combinations and alterations may occur depending on design requirements and other factors insofar as they are within the scope of the appended claims or the equivalents thereof.

Further, respective steps included in the processing of the position correction system 1 of the present specification are not necessarily processed in chronological order in accordance with the flowcharts. For example, the respective steps included in the processing of the position correction system 1 may be processed in different order from the flowcharts, or may be processed in a parallel manner.

Further, it is also possible to create a computer program for causing hardware such as the CPU 301, the ROM 302, and the RAM 303, which are built in the position correction apparatus 20, to exhibit equivalent functions as those of respective structures of the position correction apparatus 20 described above. Further, there is also provided a storage medium having the computer program stored therein.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It should be noted that the present disclosure can also take the following configurations.

[1]. A position correction apparatus comprising:
an appropriate range specification section which specifies an appropriate range having, as a reference, a first position information among a plurality of pieces of position information with which estimation times are associated; and
a position information correction section which corrects a second position information, the estimation time of which is after the estimation time of the first position information, in a case where the second position information is outside the appropriate range specified by the appropriate range specification section.

[2]. The position correction apparatus according to [1], wherein the position information correction section corrects the second position information to position information which is the nearest to the second position information within the appropriate range.

[3]. The position correction apparatus according to [1], wherein, in a case where the plurality of pieces of position information each indicate a position of a mobile terminal of a user, the appropriate range specification section specifies the appropriate range based on an action label indicating an action of the user holding the mobile terminal.

[4]. The position correction apparatus according to [1], wherein the position information correction section specifies, as the appropriate range, an inside of a circle having the first position information as a reference.

[5]. The position correction apparatus according to [1], wherein, in a case where the plurality of pieces of position information each indicate a position of a mobile terminal of a user, the appropriate range specification section specifies the appropriate range based on route information indicating a position at which a route exists.

[6]. The position correction apparatus according to [5], wherein the appropriate range specification section specifies, as the appropriate range, the position at which the route exists, which is indicated by the route information.

[7]. The position correction apparatus according to [1], wherein, in a case where the plurality of pieces of position information each indicate a position of a mobile terminal of a user, the appropriate range specification section specifies the appropriate range based on information indicating a motion of the user detected by the mobile terminal.

[8]. The position correction apparatus according to [1], wherein, in a case where the plurality of pieces of position information each indicate a position of a mobile terminal of a user, the appropriate range specification section specifies the appropriate range based on time information formed by associating time at which a vehicle is expected to reach a station with position information of the station.

[9]. The position correction apparatus according to [1], wherein, in a case where positioning accuracy of the second position information is higher than a predetermined value, the position information correction section limits correction of the second position information even when the second position information is outside the appropriate range.

[10]. A position correction method comprising:
specifying an appropriate range having, as a reference, a first position information among a plurality of pieces of position information with which estimation times are associated; and
correcting a second position information, the estimation time of which is after the estimation time of the first position information, in a case where the second position information is outside the appropriate range.

[11] A program for causing a computer to function as a position correction apparatus including
an appropriate range specification section which specifies an appropriate range having, as a reference, a first position information among a plurality of pieces of position information with which estimation times are associated, and
a position information correction section which corrects a second position information, the estimation time of which is after the estimation time of the first position information, in a case where the second position information is outside the appropriate range specified by the appropriate range specification section.

[12]. A position correction system comprising:
a mobile terminal including
a position information acquisition section which acquires a plurality of pieces of position information with which estimation times are associated, and
a transmission section which transmits the plurality of pieces of position information acquired by the position information acquisition section; and
a position correction apparatus including
a reception section which receives the plurality of pieces of position information from the mobile terminal,
an appropriate range specification section which specifies an appropriate range having, as a reference, a first position information among the plurality of pieces of position information received by the reception section, and
a position information correction section which corrects a second position information, the estimation time of which is after the estimation time of the first position information, in a case where the second position information is outside the appropriate range specified by the appropriate range specification section.

[13]. The position correction apparatus according to [1], wherein, in a case where positioning accuracy of the second position information is higher than a predetermined value, the appropriate range specification section specifies an appropriate range having the second position information as a reference, and
wherein the position information correction section corrects a third position information, the estimation time of which is after the estimation time of the second position information, in a case where the third position information is outside, the appropriate range specified by the appropriate range specification section.

What is claimed is:
1. An information processing apparatus comprising:
processor configured to:
determine a correction value corresponding to a first position at which a terminal is estimated to be positioned at a first time, in which the first position is indicated by first position information of the terminal provided to the processor; and
correct a second position of the terminal based on the correction value, in which the second position is a position at which the terminal is estimated to be positioned at a second time, in which the second position is indicated by second position information of the terminal provided to the processor,
wherein the information processing apparatus determines the correction value based on an action label of the terminal, in which the action label indicates a state of movement of the terminal.

2. The information processing apparatus of claim 1, wherein the correction value is a range.

3. The information processing apparatus of claim 1, wherein the second position is determined by using inside of a boundary, in which the boundary is in accordance with the correction value.

4. The information processing apparatus of claim 1, wherein the processor is configured to:
obtain the second position by determining a position indicated by the correction value.

5. The information processing apparatus of claim 1, wherein the processor is configured to:
associate the action label with the terminal based on an action of the terminal; and determine the correction value based on the first position and the action label.

6. The information processing apparatus of claim 1, wherein the processor is configured to:
    determine a circular boundary having a designated radius, the first position being included within the circular boundary; and
    determine the correction value based on the circular boundary.

7. The information processing apparatus of claim 1, wherein the processor is configured to:
    determine route information for the terminal based on the first position; and,
    determine the correction value based on the route information.

8. The information processing apparatus of claim 7, wherein the processor is configured to determine the route information by associating the first position with a position of a road.

9. The information processing apparatus of claim 7, wherein the processor is configured to determine the route information by associating the first position with a position of a railway track.

10. The information processing apparatus of claim 7, wherein the processor is configured to:
    associate a destination with the terminal based on the route information;
    estimate a time of arrival of the terminal at the destination associated with the terminal; and,
    determine the correction value based on the estimated time of arrival of the terminal at the destination.

11. The information processing apparatus of claim 1, wherein the processor is configured to:
    determine a change in the first position based on a movement of the terminal; and
    recalculate the correction value based on the change in the first position.

12. An information processing apparatus comprising:
    a processor configured to:
        determine a correction value corresponding to a first position at which a terminal is estimated to be positioned at a first time, in which the first position is indicated by first position information of the terminal provided to the processor; and
        correct a second position of the terminal based on the correction value, in which the second position is a position at which the terminal is estimated to be positioned at a second time, in which the second position is indicated by second position information of the terminal provided to the processor,
    wherein the information processing apparatus determines the correction value based on an action label of the terminal; and
    wherein the processor is configured to:
        determine a position accuracy for the first position;
        determine if the position accuracy for the first position is equal to or greater than a predetermined value; and
        associate the first position with the terminal when a determination indicates that the position accuracy for the first position is equal to or greater than the predetermined value.

13. An information processing apparatus comprising:
    a processor configured to:
        determine a correction value corresponding to a first position at which a terminal is estimated to be positioned at a first time, in which the first position is indicated by first position information of the terminal provided to the processor; and
        correct a second position of the terminal based on the correction value, in which the second position is a position at which the terminal is estimated to be positioned at a second time, in which the second position is indicated by second position information of the terminal provided to the processor,
    wherein the information processing apparatus determines the correction value based on an action label of the terminal; and
    wherein the processor is configured to:
        determine a positioning accuracy for the second position; and
        determine if the positioning accuracy for the second position is less than a predetermined value,
    wherein the second position is corrected when a determination is the second position is outside the correction value and the positioning accuracy for the second position is less than the predetermined value.

14. The information processing apparatus of claim 1, wherein the terminal is selected from the group consisting of a personal computer, a video processing apparatus, a mobile phone, a music reproduction device, a personal digital assistant device, a game device, a global positioning device, and a consumer electronics device.

15. The information processing apparatus of claim 1, wherein at least one of the first position or the second position includes an altitude associated with the terminal device.

16. The information processing apparatus of claim 1, wherein the processor is configured to associate a time with at least one of the first position or the second position.

17. A method comprising:
    determine, by a processor, a correction value corresponding to a first position at which a terminal is estimated to be positioned at a first time, in which the first position is indicated by first position information of the terminal provided to the processor; and
    correct, by the processor, a second position of the terminal based on the correction value, in which the second position is a position at which the terminal is estimated to be positioned at a second time, in which the second position is indicated by second position information of the terminal provided to the processor,
    wherein the correction value is based on an action label of the terminal, in which the action label indicates a state of movement of the terminal.

18. A non-transitory computer-readable storage unit on which computer readable instructions of a program are stored, the instructions, when executed by a processor, causing the processor to:
    determine a correction value corresponding to a first position at which a terminal is estimated to be positioned at a first time, in which the first position is indicated by first position information of the terminal provided to the processor; and
    correct a second position of the terminal based on the correction value, in which the second position is a position at which the terminal is estimated to be positioned at a second time, in which the second position is indicated by second position information of the terminal provided to the processor,
    wherein the correction value is determined based on an action label of the terminal in which the action label indicates a state of movement of the terminal.

* * * * *